United States Patent [19]
Baker et al.

[11] Patent Number: 5,781,729
[45] Date of Patent: Jul. 14, 1998

[54] SYSTEM AND METHOD FOR GENERAL PURPOSE NETWORK ANALYSIS

[75] Inventors: Peter D. Baker, Aliso Viejo; Karen Neal, Los Angeles, both of Calif.

[73] Assignee: NB Networks, Aliso Viejo, Calif.

[21] Appl. No.: 888,875

[22] Filed: Jul. 7, 1997

Related U.S. Application Data

[63] Continuation of Ser. No. 575,506, Dec. 20, 1995.
[51] Int. Cl.⁶ .................................................. H04L 12/00
[52] U.S. Cl. .................................. 395/200.6; 364/551.01
[58] Field of Search ........................... 395/200.6, 200.61, 395/200.66, 200.68, 200.8; 364/551.01; 371/48, 68.2

[56] References Cited

U.S. PATENT DOCUMENTS

| | | | |
|---|---|---|---|
| 4,851,997 | 7/1989 | Tatara | 395/200.58 |
| 5,062,055 | 10/1991 | Chinnaswamy et al. | 364/551.01 |
| 5,210,530 | 5/1993 | Kammerer et al. | 340/825.08 |
| 5,442,639 | 8/1995 | Crowder et al. | 371/20.1 |

*Primary Examiner*—Emanuel Todd Voeltz
*Assistant Examiner*—Thomas Peeso
*Attorney, Agent, or Firm*—Lyon & Lyon LLP

[57] ABSTRACT

A network interface system and related methods. A single logic control module, which may be implemented in hardware or software, is utilized to perform any of a number of data manipulation functions including, for example, parsing, filtering, data generation or analysis, based upon one or more programmably configurable protocol descriptions which may be stored in and retrieved from an associated memory.

14 Claims, 20 Drawing Sheets

Fig. 4

Ethernet Control Record

| Protocol Name | NumBits | NumFields | CurField | Fields | Options |
|---|---|---|---|---|---|
| Ethernet MAC Header | 112 | 5 | 0 | Figure 4a | [None] |

Fig. 4A

| Index | Field Name | Bit Offset | Bit Length | Left Shift | Right Shift | Check sum | Frame Length Length | Header Length | Statistics | Lookup Structure | Filter Structure | Format |
|---|---|---|---|---|---|---|---|---|---|---|---|---|
| 0 | Dst Vendor Address | 0 | 24 | 0 | 16 | 0 | 0 | 0 | [None] | Fig 4b | Fig 10,Idx 0 | hex |
| 1 | Dst Station Address | 24 | 24 | 0 | 16 | 0 | 0 | 0 | [None] | [None] | Fig 10,Idx 1 | hex |
| 2 | Src Vendor Address | 48 | 24 | 0 | 16 | 0 | 0 | 0 | [None] | Fig 4c | [None] | hex |
| 3 | Src Station Address | 72 | 24 | 0 | 16 | 0 | 0 | 0 | [None] | [None] | [None] | hex |
| 4 | Type | 96 | 16 | 0 | 16 | 0 | 0 | 0 | [None] | Fig 4d | [None] | hex |

Fig. 4B

Destination Vendor Address Lookup Structure

| Protocol | Next Index | Minimum | Maximum | Mask | Translation |
|---|---|---|---|---|---|
| [None] | 1 | 0x000000 | 0x000000 | ALL | "Fast Routers, Inc." |
| [None] | 1 | 0x000001 | 0xFFFFFF | ALL | "Unknown" |

Source Vendor Address Lookup Structure

| Protocol | Next Index | Minimum | Maximum | Mask | Translation |
|---|---|---|---|---|---|
| [None] | 3 | 0x000000 | 0x000000 | ALL | "Fast Routers, Inc." |
| [None] | 3 | 0x000001 | 0xFFFFFF | ALL | "Unknown" |

Fig. 4C

Ethernet Type Lookup Structure

| Protocol | Next Index | Minimum | Maximum | Mask | Translation |
|---|---|---|---|---|---|
| [None] | 5 | 0x0000 | 0x8887 | ALL | "Unknown" |
| Figure 5 | 5 | 0x8888 | 0x8888 | ALL | "GP" |
| [None] | 5 | 0x8889 | 0xFFFF | ALL | "Unknown" |

| Protocol Name | NumBits | NumFields | CurField | Fields | Options |
|---|---|---|---|---|---|
| GP - Generic Protocol | 160 | 11 | 0 | Figure 5a | Figure 6 |

GP Control Record

Fig. 5A

| Index | Field Name | Byte Offset | Bit Length | Left Shift | Right Shift | Check sum | Frame Length | Header Length | Statistics | Lookup Structure | Filter | Format |
|---|---|---|---|---|---|---|---|---|---|---|---|---|
| 0 | Version No. | 0 | 4 | 0 | 28 | 0 | 0 | 0 | Cnt/Index&Cnt | [None] | [None] | decimal |
| 1 | HeaderLen | 0 | 4 | 4 | 28 | 0 | 0 | 32 | Sum/Index&Cnt | Fig 5b | [None] | decimal |
| 2 | Frame Length | 0 | 16 | 8 | 16 | 0 | 8 | 0 | Sum | [None] | [None] | decimal |
| 3 | Frame Type | 0 | 8 | 24 | 24 | 0 | 0 | 0 | Index&Cnt | Fig 5c | Fig 10,Idx 2 | hex |
| 4 | Checksum | 4 | 16 | 0 | 16 | ptr | 0 | 0 | [None] | [None] | [None] | hex |
| 5 | Control | 4 | 8 | 16 | 24 | 0 | 0 | 0 | [None] | [None] | [None] | bitfield |
| 6 | Hop Count | 4 | 8 | 24 | 24 | 0 | 0 | 0 | [None] | [None] | [None] | decimal |
| 7 | Source Socket | 8 | 16 | 0 | 16 | 0 | 0 | 0 | [None] | Fig 5d | [None] | hex |
| 8 | Destination Socket | 8 | 16 | 16 | 16 | 0 | 0 | 0 | [None] | Fig 5e | [None] | hex |
| 9 | Source Address | 12 | 32 | 0 | 0 | 0 | 0 | 0 | [None] | [None] | [None] | hex |
| 10 | Destination Address | 16 | 32 | 0 | 0 | 0 | 0 | 0 | [None] | [None] | [None] | hex |

Header Length Lookup Structure

| Protocol | Next Index | Minimum | Maximum | Mask | Translation |
|---|---|---|---|---|---|
| [None] | 11 | 0x0 | 0x4 | ALL | "Invalid Length" |
| [None] | 2 | 0x5 | 0xF | ALL | "bytes" |

*Fig. 5B*

Frame Type Next Protocol Structure

| Protocol | Next Index | Minimum | Maximum | Mask | Translation |
|---|---|---|---|---|---|
| [None] | 4 | 0x00 | 0x00 | ALL | "Illegal Protocol" |
| GP1 | 4 | 0x01 | 0x01 | ALL | "GP1" |
| GP2 | 5 | 0x02 | 0x02 | ALL | "GP2" |
| [None] | 4 | 0x03 | 0xFF | ALL | "Illegal Protocol" |

*Fig. 5C*

Source Socket Next Protocol Structure

| Protocol | Next Index | Minimum | Maximum | Mask | Translation |
|---|---|---|---|---|---|
| [None] | 8 | 0x0000 | 0x0142 | ALL | "Unknown Protocol" |
| GP3 | 8 | 0x0143 | 0x018F | ODD | "GP3" |
| GP4 | 8 | 0x0143 | 0x018F | EVEN | "GP4" |
| [None] | 8 | 0x0190 | 0xFFFF | ALL | "Illegal Protocol" |

Fig. 5D

Destination Socket Next Protocol Structure

| Protocol | Next Index | Minimum | Maximum | Mask | Translation |
|---|---|---|---|---|---|
| [None] | 9 | 0x0000 | 0x0142 | ALL | "Unknown Protocol" |
| GP3 | 9 | 0x0143 | 0x018F | ODD | "GP3" |
| GP4 | 9 | 0x0143 | 0x018F | EVEN | "GP4" |
| [None] | 9 | 0x0190 | 0xFFFF | ALL | "Illegal Protocol" |

Fig. 5E

GP Master Option Control Record

| Protocol Name | NumBits | NumFields | CurField | Fields | Options |
|---|---|---|---|---|---|
| GP Master Option | 0 | 1 | 0 | Figure 6a | [None] |

Fig. 6

| Index | Field Name | Bit Offset | Bit Length | Left Shift | Right Shift | Check sum | Frame Length | Header Length | Statistics | Lookup Structure | Filter | Format |
|---|---|---|---|---|---|---|---|---|---|---|---|---|
| 0 | [None] | 0 | 0 | 0 | 24 | 0 | 0 | 0 | [None] | Figure 6b | [None] | [None] |

Fig. 6A

Vendor Address Lookup Structure

| Protocol | Next Index | Minimum | Maximum | Mask | Translation |
|---|---|---|---|---|---|
| Figure 7 | 1 | 0x00 | 0x00 | ALL | "GP EOL Option" |
| Figure 8 | 1 | 0x01 | 0x01 | ALL | "GP NoOp Option" |
| Figure 9 | 1 | 0x02 | 0x02 | ALL | "GP MaxSize Option" |
| [None] | 1 | 0x03 | 0xFF | ALL | "Unknown Option" |

Fig. 6B

Fig. 7 — GP EOL Option Control Record

| Protocol Name | NumBits | NumFields | CurField | Fields | Options |
|---|---|---|---|---|---|
| GP End of List Option | 8 | 1 | 0 | Figure 7a | [None] |

Fig. 7A

| Index | Field Name | Bit Offset | Bit Length | Left Shift | Right Shift | Check sum | Frame Length | Header Length | Statistics | Lookup Structure | Filter | Format |
|---|---|---|---|---|---|---|---|---|---|---|---|---|
| 0 | EOL | 0 | 8 | 0 | 24 | 0 | 0 | 0 | [None] | Figure 7b | [None] | hex |

Fig. 7B — EOL Lookup Structure

| Protocol | Next Index | Minimum | Maximum | Mask | Translation |
|---|---|---|---|---|---|
| Figure 6 | 1 | 0x00 | 0x00 | ALL | "EOL" |

GP NoOp Option Control Record

| Protocol Name | NumBits | NumFields | CurField | Fields | Options |
|---|---|---|---|---|---|
| GP NoOp Option | 8 | 1 | 0 | Figure 8a | [None] |

Fig. 8

| Index | Field Name | Bit Offset | Bit Length | Left Shift | Right Shift | Check sum | Frame Length | Header Length | Statistics | Lookup Structure | Filter | Format |
|---|---|---|---|---|---|---|---|---|---|---|---|---|
| 0 | NoOp | 0 | 8 | 0 | 24 | 0 | 0 | 0 | [None] | Figure 8b | [None] | hex |

Fig. 8A

NoOp Lookup Structure

| Protocol | Next Index | Minimum | Maximum | Mask | Translation |
|---|---|---|---|---|---|
| Figure 6 | 1 | 0x01 | 0x01 | ALL | "NoOp" |

Fig. 8B

Fig. 9 — GP MinMaxSize Option Control Record

| Protocol Name | NumBits | NumFields | CurField | Fields | Options |
|---|---|---|---|---|---|
| MaxSize Option | 48 | 4 | 0 | Figure 9a | [None] |

Fig. 9A

| Index | Field Name | Bit Offset | Bit Length | Left Shift | Right Shift | Check sum | Frame Length | Header Length | Statistics | Lookup Structure | Filter | Format |
|---|---|---|---|---|---|---|---|---|---|---|---|---|
| 0 | Option Type | 0 | 8 | 0 | 24 | 0 | 0 | 0 | [None] | Figure 9b | [None] | hex |
| 1 | Option Length | 0 | 8 | 8 | 24 | 0 | 0 | 8 | [None] | [None] | [None] | hex |
| 2 | MinSize | 0 | 16 | 16 | 16 | 0 | 0 | 0 | [None] | [None] | [None] | decimal |
| 3 | MaxSize | 4 | 16 | 0 | 16 | 0 | 0 | 0 | [None] | [None] | [None] | decimal |

Fig. 9B — MinMaxSize Lookup Structure

| Protocol | Next Index | Minimum | Maximum | Mask | Translation |
|---|---|---|---|---|---|
| Figure 6 | 1 | 0x02 | 0x02 | ALL | "MinMaxSize" |

Filter Channel Control Structure

| System Filter Status | Number of Filters | Pointer to Filter Channels |
|---|---|---|
| FILTER_FRAME | 1 | Figure 10a |

*Fig. 10*

Filter Channels

| Index | NextCriteriaIndex | TotalCriteria | Criteria Pointer | Channel Name |
|---|---|---|---|---|
| 0 | 0 | 3 | Figure 10b | GP Type or Station |

*Fig. 10A*

Filter Criteria

| Index | Channel Ptr | Lookup Pointer | Protocol Pointer | Field Pointer |
|---|---|---|---|---|
| 0 | Figure 10a, Index 0 | Figure 10c | Figure 4 | Figure 4a, Index 0 |
| 1 | Figure 10a, Index 0 | Figure 10d | Figure 4 | Figure 4a, Index 1 |
| 2 | Figure 10a, Index 0 | Figure 10e | Figure 5 | Figure 5a, Index 3 |

*Fig. 10B*

| Index 0 | Filter Condition Lookup Structure | | | | |
|---|---|---|---|---|---|
| Return Value | NextIndex | Minimum | Maximum | Mask | Translation |
| FILTER_FRAME | 2 | 0x000000 | 0x08FFFE | ALL | "" |
| FILTER_FRAME | 1 | 0x08FFFF | 0x08FFFF | ALL | "Vendor XXX" |
| FILTER_FRAME | 2 | 0x090000 | 0xFFFFFF | ALL | "" |

Fig. 10C

| Index 1 | Filter Condition Lookup Structure | | | | |
|---|---|---|---|---|---|
| Return Value | NextIndex | Minimum | Maximum | Mask | Translation |
| FILTER_FRAME | 2 | 0x000000 | 0x334454 | ALL | "" |
| PASS_FRAME | 3 | 0x334455 | 0x334455 | ALL | "334455" |
| FILTER_FRAME | 2 | 0x334456 | 0xFFFFFF | ALL | "" |

Fig. 10D

| Index 2 | Filter Condition Lookup Structure | | | | |
|---|---|---|---|---|---|
| Return Value | NextIndex | Minimum | Maximum | Mask | Translation |
| FILTER_FRAME | 3 | 0x00 | 0x00 | ALL | "" |
| PASS_FRAME | 3 | 0x01 | 0x02 | ALL | "GP1 or GP2" |
| FILTER_FRAME | 3 | 0x03 | 0xFF | ALL | "" |

Fig. 10E

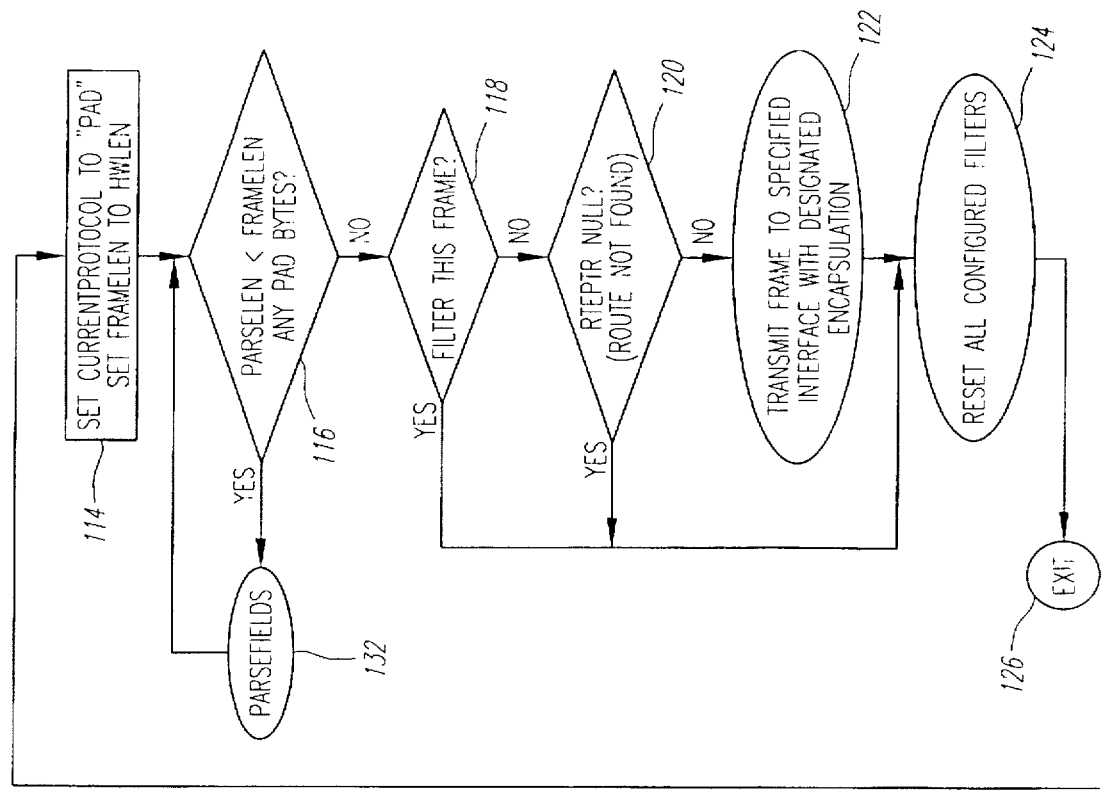
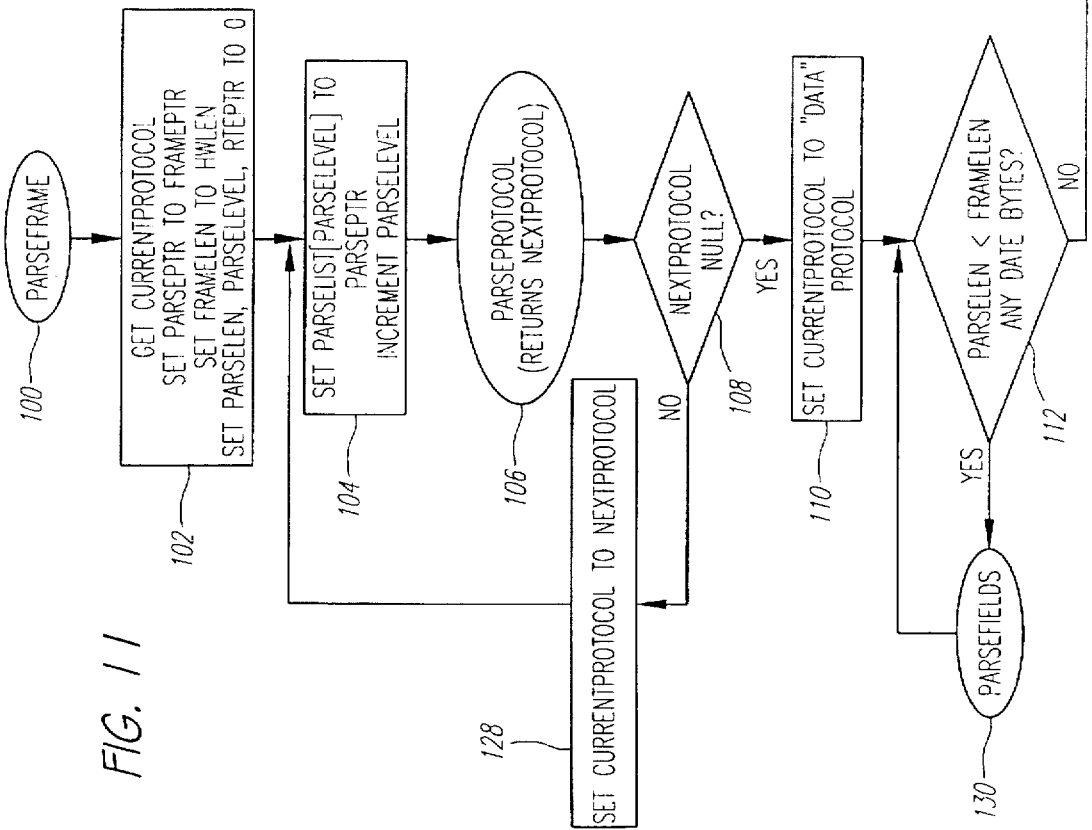
FIG. 11

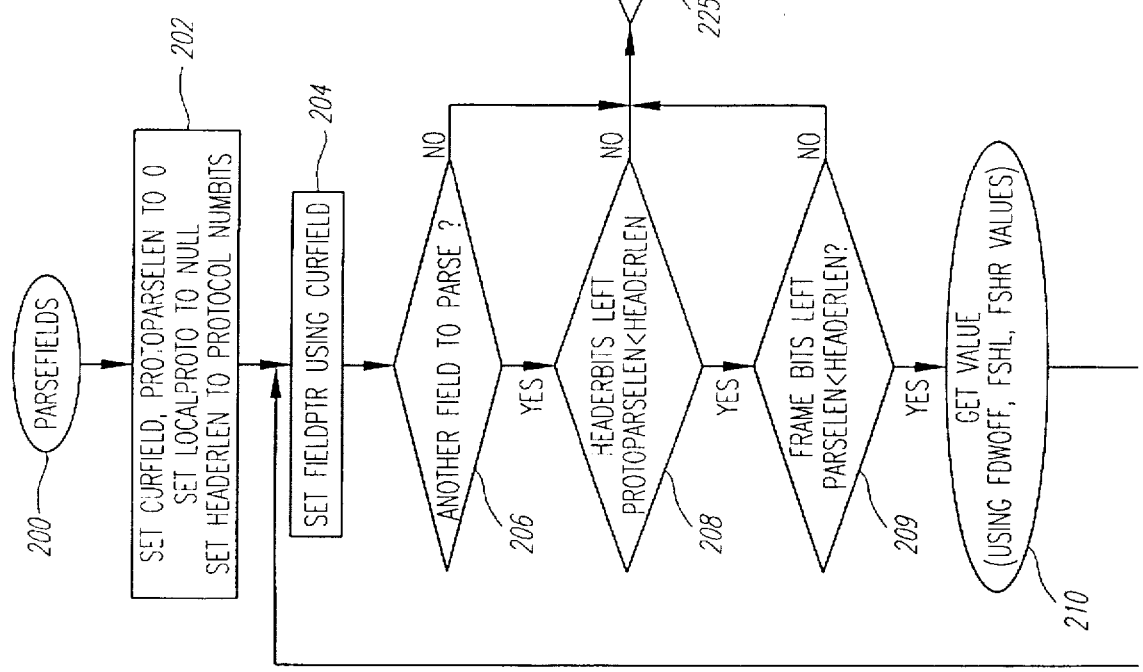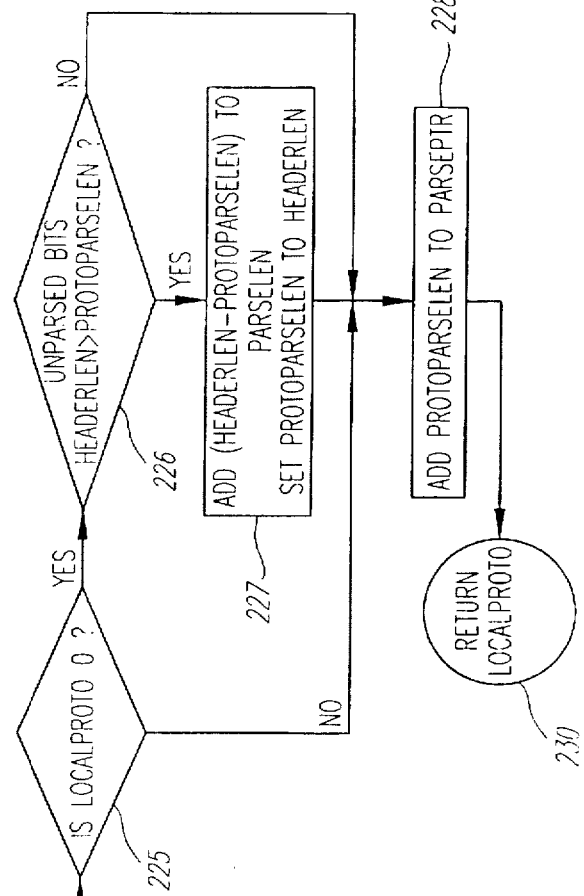
FIG. 13
FIG. 13A

SYSTEM AND METHOD FOR GENERAL PURPOSE NETWORK ANALYSIS

This is a continuation of co-pending application Ser. No. 08/575,506, filed on Dec. 20, 1995.

TECHNICAL FIELD

The present invention relates to network communications systems and, in particular, to improved systems and methods for parsing, filtering, generating and analyzing data composed of inter-related structures such as protocols found within network frames.

BACKGROUND ART

Existing network interface devices provide systems for receiving, analyzing, filtering and transmitting network data or frames of data. Network Protocol Analyzers, Bridges, and Routers are among the most common network interface devices currently available.

Conventional network protocol analyzers provide, for a predefined set of network frame structures or protocols, a system for monitoring the activity of a network and the stations on it by allowing network traffic to be captured and stored for later analysis. Common capture and analysis capabilities include the gathering of statistics, subsequent report generation, the ability to filter frames based on specific criteria; and the ability to generate network traffic.

Bridges and routers are network devices that pass frames from one network interface to another. Bridges operate at the data-link layer and routers at the network layer of the OSI reference model. Like protocol analyzers, both bridges and routers may gather statistics and filter incoming network frames based on specific criteria, however incoming frames also may be forwarded to other networks based on information collected by the bridge or router. Routers typically support only a limited number of network protocols.

Each of these network devices requires an ability to separate network frames into individual protocols and their components (typically referred to as parsing), an ability to filter incoming frames based on a logical combination of one or more field values extracted during parsing, and an ability to gather statistics based in part on extracted field values. Typically, it is a requirement that network frames be received, analyzed and forwarded at full network speeds, sometimes on many different networks at one time.

A frame filter consists of one or more criteria which specify one or more valid values for a frame (or segments of a frame). Frame filtering criteria are typically implemented using an offset (from frame or protocol header start), a length in bits which defines a field, a value for comparison, and mask values for identifying relevant and irrelevant bits within the field. For multiple value filter criteria, the result from each filter value is logically OR'ed together to obtain an overall result. Therefore, each additional result adds to the processing required to filter a given field. For filtering on optional protocol fields that do not occur at the same relative offset in each protocol frame, this method is time-consuming. Thus, it would be desirable to perform filtering on both fixed and optional variable offset fields for any number of values or ranges of values without incurring any additional overhead.

Parsing, the process wherein network frames are broken up into their individual protocols and fields, is necessary for filtering with offsets relative to protocol headers, gathering field based statistics, generating network traffic, routing data frames, verifying field values, and displaying network frames in human readable form. In conventional systems, the parsing process has an overall structure which incorporates control logic for each supported protocol. Therefore, additional control logic must be developed when support for a new protocol is added to a conventional system. As the development of additional control logic, whether implemented in hardware or software, may be both time consuming and expensive, it would be highly desirable to be able to parse all protocols with a single configurable software (or hardware) module so that support for additional protocols could be added to a system without requiring substantial modification to the system or its control logic.

Further, although microprocessors (or CPUs) available today can execute tens or even hundreds of millions of instructions per second, vendors often must provide dedicated hardware assistance and/or front-end processors with hand-coded assembly language routines to achieve the necessary processing rates for more than one pair of networks. Unfortunately, this solution requires hardware and/or software modifications whenever changes are made to the number of supported features or protocols.

Finally, as networks become larger and more complex, the maintenance of a comprehensive statistics database by each network device becomes more important. Because these statistics databases typically are not utilized by a maintaining device, but instead are collected by a network management device, the collection process may affect performance adversely without any corresponding benefit to the collecting device.

In light of the considerations discussed above, it is believed that a network interface system having a configurable protocol analysis capability with common control logic applicable to many different network devices would be highly desirable.

SUMMARY OF INVENTION

The present invention is directed to improved systems and methods for parsing, filtering, generating and analyzing data (or frames of data) transmitted over a data communications network. In one particularly innovative aspect of the present invention, a single logic control module, which may be implemented in hardware or software, is utilized to perform any of a number of data manipulation functions (for example, parsing, filtering, data generation or analysis functions) based upon one or more programmably configurable protocol descriptions which may be stored in and retrieved from an associated memory.

The use of common control logic (i.e. the use of a single logic control module) and programmably configurable protocol descriptions allows changes to existing protocols to be made and support for new protocols to be added to a system in accordance with the present invention through configuration only—without the need for hardware and/or software system modifications. Thus, those skilled in the art will appreciate that a network interface in accordance with the present invention may be configured and reconfigured, if necessary, in a highly efficient and cost effective manner to implement numerous data manipulation functions and to accommodate substantial network modifications (for example, the use of different data transmission hardware, protocols or protocol suites) without necessitating substantial system changes.

In one preferred form, the system of the present invention may employ a CPU or other hardware implementable method for analyzing data from a network in response to selectively programmed parsing, filtering, statistics gathering, and display requests. Moreover, the system of the present invention may be incorporated in a network device, such as a network analyzer, bridge, router, or traffic generator, including a CPU and a plurality of input devices, storage devices, and output devices, wherein frames of network data may be received from an associated network, stored in the storage devices, and processed by the CPU based upon one or more programmably configurable protocol descriptions also stored in the storage devices. The protocol descriptions may take the form of one or more protocol description files for each supported network protocol and may include a protocol header record and plurality of field sub-records having data corresponding to an associated protocol and fields defined therein.

The system of the present invention also preferably includes logic for extracting field values from particular network frames, performing validation and error checking, and making parsing decisions based upon field values and information in the programmably configurable protocol descriptions.

The system of the present invention also preferably includes logic for filtering a subset of network frames received from the input or storage devices which satisfy a filter criteria based upon information defined in the programmably configurable protocol descriptions.

The system of the present invention also preferably includes logic for filtering network frames which satisfy a plurality of filter criteria which, if desired, may be joined together by Boolean operators.

The system of the present invention also preferably includes logic for analyzing a filter request by breaking the request into its component criteria to determine whether the result from evaluating a particular filter request criteria when combined with results from earlier criteria can be used to filter (i.e. discard) a particular network frame.

The system of the present invention also preferably includes logic for collecting statistics based upon extracted field values satisfying a statistics criteria based upon information defined in the programmably configurable protocol descriptions.

The system of the present invention also preferably includes logic for determining a next protocol description structure required to continue analyzing a network frame.

The system of the present invention also preferably includes logic for determining a frame length and individual protocol header lengths from extracted field values in a network frame.

The system of the present invention also preferably includes logic for making routing decisions based upon information contained in the programmably configurable protocol descriptions.

The system of the present invention also preferably includes logic for determining display formats based on information contained in the programmably configurable protocol descriptions.

The system of the present invention also preferably includes logic for verifying individual field values and making parsing decisions based on the validity of the value.

The system of the present invention also preferably includes logic for constructing and transmitting network frames with varying field contents based on information contained in the programmably configurable protocol descriptions.

The system of the present invention may be employed in any system where it is useful to be able to examine and perform various operations on contiguous bit-fields in data structures, wherein each data structure is composed of predefined fields of one or more contiguous bits. Further, the system of the present invention is particularly efficient where operations must be performed on a subset of included fields.

Those skilled in the art will recognize that the system of the present invention gains a distinct advantage in size and maintainability over conventional network devices by implementing analysis capabilities for multiple known and unknown protocols using common control logic. Furthermore, the system gains a distinct advantage in speed and efficiency over conventional network devices when the control logic is implemented in hardware or a front-end processor, without incurring the penalty of additional hardware and/or software development when protocol definitions change.

Accordingly, it is an object of the present invention to provide an improved system for network analysis wherein the system may determine which protocols and which protocol fields exist in a network frame (also referred herein as parsing) using common control logic combined with configurable protocol descriptions.

It is yet another object of the present invention to provide an improved system for network analysis wherein the control logic may be implemented in hardware as well as software.

It is yet another object of the present invention to provide an improved system for network analysis wherein each supported analysis capability is configurable even when the control logic is implemented in hardware.

It is another object of the present invention to provide an improved system for network analysis wherein the system may determine whether a particular network frame includes a field that satisfies a particular filter criteria based upon information stored in a programmably configurable protocol description.

It is yet another object of the present invention to provide an improved system for network analysis wherein the system may determine if a particular network frame includes a protocol field that satisfies a particular statistics gathering criteria defined in a programmably configurable protocol description.

It is yet another object of the present invention to provide an improved system for network analysis wherein the system may generate network traffic in the form of frames constructed from selected protocol descriptions with the ability to specify a variety of methods for varying individual field values.

It is still another object of the present invention to provide an improved system for network analysis wherein the system may route network frames (determine the appropriate destination interface) that satisfy a particular routing criteria defined in a programmably configurable protocol description while providing a capability to specify a variety of methods for varying individual field values during the routing process.

It is still another object of the present invention to provide an improved system for network analysis wherein the system may determine if a particular network frame includes a protocol field that contains a value related to either the overall length of the frame or the current protocol header length.

BRIEF DESCRIPTION OF THE DRAWINGS

FIG. 4 is a diagram representing a control record of an Ethernet protocol description which may be utilized in a network interface system in accordance with one form of the present invention.

FIG. 4a is a diagram representing five defined field sub-records of the Ethernet protocol description illustrated in FIG. 4.

FIGS. 4b, 4c, and 4d are diagrams representing lookup structures referenced in FIG. 4a fields 0, 2 and 4 respectively.

FIG. 5 is a diagram representing a control record of an imaginary Generic Protocol description which may be utilized in a network interface system in accordance with one form of the present invention.

FIG. 5a is a diagram representing eleven defined field sub-records of the GP description illustrated in FIG. 5.

FIGS. 5b, 5c, 5d, and 5e are diagrams representing lookup structures referenced in FIG. 5(a) fields 1, 3, 7 and 8, respectively.

FIGS. 6, 6a, and 6b are diagrams representing the control record and field sub-record of a protocol description structure that allows parsing of optional fields of the GP description shown in FIGS. 5–5e.

FIGS. 7, 7a, and 7b are diagrams representing the control record and field sub-records of a protocol description structure that describes the End Of List option of the GP description shown in FIGS. 5–5e.

FIGS. 8, 8a, and 8b are diagrams representing the control record and field sub-records of a protocol description structure that describes the No Operation option of the GP description shown in FIGS. 5–5e.

FIGS. 9, 9a, and 9b are diagrams representing the control record and field records of a protocol description file that describes the Maximum Frame Size option of the GP description shown in FIGS. 5–5e.

FIGS. 10, 10a, 10b, 10c, 10d and 10e are diagrams representing data records of a filter expression control and associated field filter structures.

FIG. 11 is a flow chart illustrating top level frame parsing control logic in accordance with one form of the present invention.

DESCRIPTION OF PREFERRED EMBODIMENTS

Figure 1:
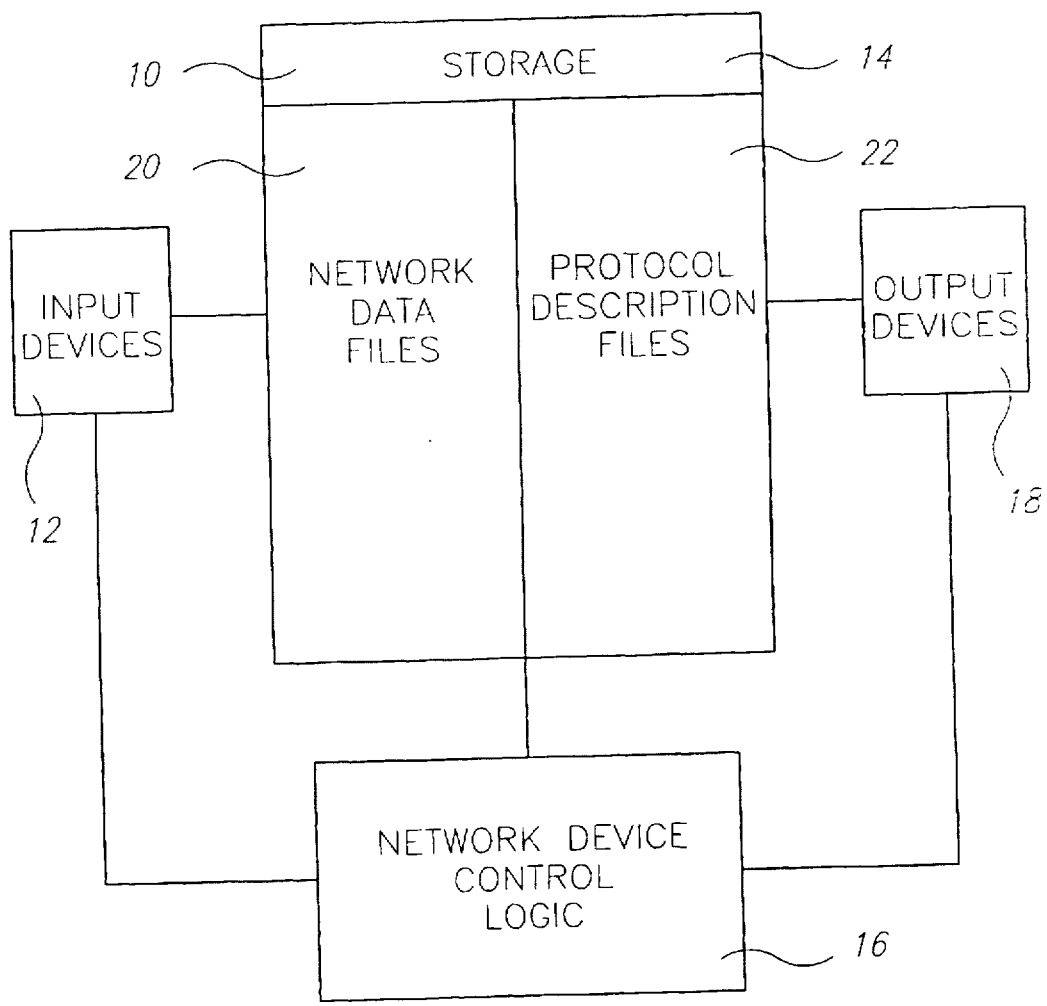
FIG. 1 is a block diagram of a network interface system in accordance with one form of the present invention.

Referring now to FIG. 1, a network interface system in accordance with one form of the present invention, generally referred to as 10, may be implemented in a network device including input devices 12, data storage devices 14, analysis control logic 16 for facilitating the input, storage, retrieval, and analysis of network frames, and output devices 18 for forwarding frames or displaying or printing the results of analyses. A data storage device 14 may include a data file 20 of network frames having n protocol data records, wherein each data record contains data stored in a plurality of predefined fields. Protocol description files 22 also may be stored in the data storage device 14. The protocol description files 22 may include a protocol control record and n field sub-records, which together may describe a subset of a network protocol and include rules for analyzing that protocol.

The network device control logic 16 is capable of retrieving a subset of network frames from the input devices 12 or data files 20 which satisfy one or more criteria based upon extracted field values and filtering criteria contained in one or more of the protocol description files 22. The network device control logic 16 also includes logic for determining frame and protocol header lengths, gathering statistics, verification and error checking, determining routes, varying values, and formatting output.

A personal computer or conventional network device, such as an IBM PC (or compatible), Apple Macintosh®, or any Unix®, or Zenix® workstation, protocol analyzer, bridge, router, traffic generator, or similar system may be utilized in accordance with the system of the present invention. The data input devices 12 may comprise any of a number of commercially available network interface devices and may include a conventional keyboard or mouse if required. The data storage devices 14 may take the form of any of a number of commercially available data storage options (such as RAM, ROM, EPROM, or various sized fixed disk drives), and the data output devices 18 may comprise any of a number of commercially available user interface devices, such as CRT displays, monitors, network interface devices and/or printers (if required). The analysis control logic 16 may be implemented as a computer program written in any language suitable for systems programming or may be implemented in hardware if better performance is required. In one presently preferred form, the analysis control logic 16 may be implemented via the programming files set forth in the attached Appendix, which is herein incorporated by reference. However, those skilled in the art will appreciate that the analysis control logic 16 might equivalently be implemented in dedicated hardware using, for example, one or more application specific integrated circuits ("ASICs") or one or more field programmable gate arrays ("FPGAs").

The network interface system 10 of the present invention is preferably implemented on a personal computer, workstation or conventional network device having a 32-bit or larger bus and register set, an optional math co-processor, at least one megabyte of available RAM, and for personal computer and workstation applications, a fixed disk having at least 10 megabytes of available storage space. As shown in the attached Appendix, the analysis control logic 16 may be programmed in the C++ language, with abstract data types defined for statistics gathering, value verification, next protocol determination, filtering, varying values, checksumming and route determination capabilities, and protocol control and field records.

Figure 2:
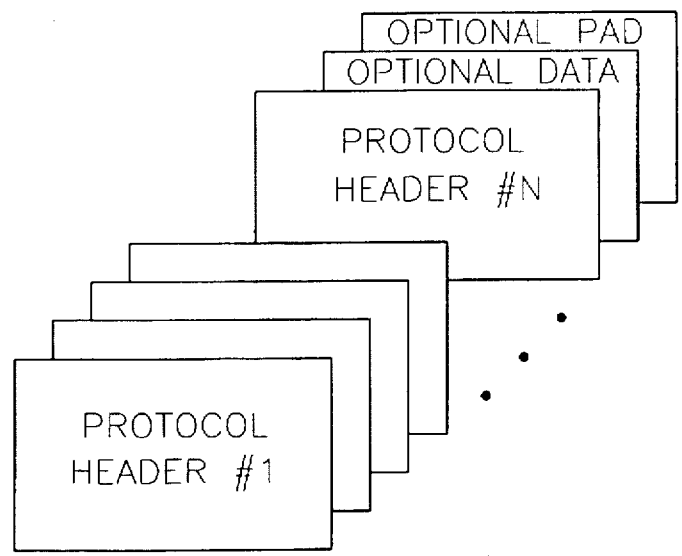
FIG. 2 is a diagram representing a set of data records of a typical network frame which may be contained in the data files of the network interface system illustrated in FIG. 1.

Referring now to FIG. 2, a data file 20 in accordance with one form of the present invention may include a plurality (n) of protocol header data records and optional Data and Pad records. Each protocol record contains data organized into a plurality of predefined fields. Each field comprises a collection of 1 or more contiguous bits and includes a set of valid values for that field. For example, a particular protocol specification might include a 6 bit header length field that limits the protocol header length to values between 20 and 60 inclusive, thereby excluding values less than 20 and values from 61 to 64.

The number of possible contiguous bit fields for a protocol header of length N bits where N is greater than 1 can be expressed by the following formula:

$$\text{Number of Possible Fields} = \sum_{i=1}^{N} i$$

It will be appreciated by those skilled in the art that any possible organization of fields for any possible protocol specification is contemplated for the network interface system 10 of the present invention.

Figure 3:
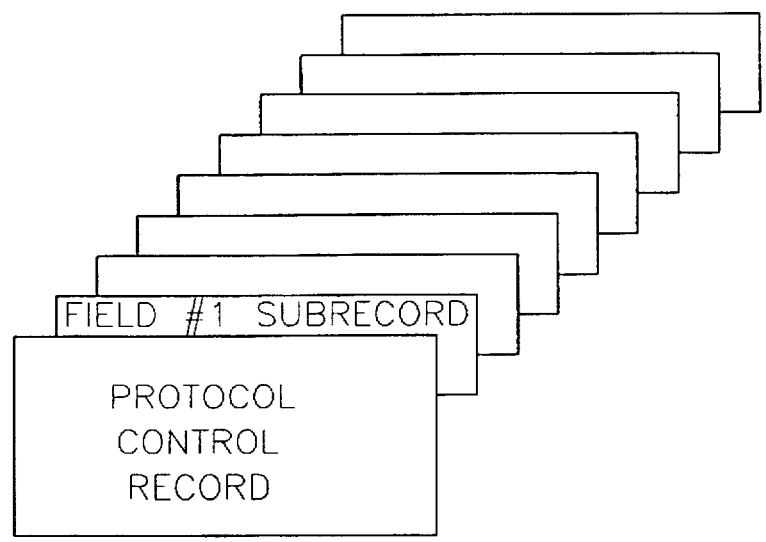
FIG. 3 is a diagram representing a set of data records of a protocol description in accordance with one form of the present invention.

Referring now to FIG. 3, a protocol description file 22 in accordance with one form of the present invention may include a protocol control record, and a plurality (n) of field data records. In a particularly preferred embodiment, the protocol control record (shown below in Table 1) may define the overall structure of a network protocol and reference other information relating to the network protocol.

TABLE 1

PROTOCOL CONTROL RECORD

| Offset | Name | Description |
|---|---|---|
| 0–3 | name_length | length of protocol name in bytes including NULL terminator |
| 4–7 | protocol_name | name of protocol control record is describing |
| 8–11 | filename | name of file control record is stored in |
| 12–15 | numBits | total bit length of protocol header control record is describing |
| 16–17 | numFields | number of fields required to describe protocol header |
| 18–19 | curField | index of field currently referenced |
| 20–23 | outFlag | flag indicating template has been output to file |
| 24–27 | dbW | display bit width for protocol header display |
| 28–31 | fields | field records that describe protocol header |
| 32–25 | options | pointer to option control record to use if this protocol has optional fields |
| 36–39 | Rt | pointer to protocol specific routing table |

The field records referenced at bytes 28–31 in the table above are preferably organized as shown in Table 2:

TABLE 2

FIELD SUB-RECORDS

| Offset | Name | Description |
|---|---|---|
| 0–3 | fplen | flag indicating value is actual length of frame (multiplier) |
| 4–7 | fblen | length of field in bits |
| 8–11 | fdwoff | byte offset from start of protocol header of 32-bit field containing value |
| 12 | fshl | number of bits to left shift 32-bit value |
| 13 | fshr | number of bits to right shift 32-bit value |
| 14 | ffmt | number indicating a display type (i.e., decimal, hex, ... ) |
| 15 | flflag | flag indicating value is actual length of protocol header (multiplier) |
| 16 | reserved | not used ... pad byte to align following fields |
| 17 | fmult | multiplier to apply to value prior to display |

TABLE 2-continued

FIELD SUB-RECORDS

| Offset | Name | Description |
|---|---|---|
| 18 | fswap | flag indicating the need to swap bytes and words in 32-bit field containing value |
| 19 | fsdspfield | flag indicating that this field should be displayed |
| 20–23 | fname | pointer to field name (0=none) |
| 24–27 | ptr2stats | pointer to configured statistics structure/class (0=none) |
| 28–31 | ptr2np | pointer to lookup structure/class ... next protocol definition to use (0=none) |
| 32–35 | ptr2vary | pointer to vary field value structure/class (0=none) |
| 36–39 | ptr2csum | pointer to checksum structure/class (0=none) |
| 40–43 | ptr2flt | pointer to filter criteria structure (0=none) |
| 44–47 | ptr2rte | pointer to Route Table structure/class (0=none) |

The statistics records referenced in Table 2, above, at bytes 24–27 are preferably organized as shown in Table 3:

TABLE 3

STATISTICS STRUCTURE/CLASS RECORD

| Offset | Name | Description |
|---|---|---|
| 0–3 | StatName | pointer to user assigned name for statistic |
| 4–7 | Stat | pointer to derived structure/class for accumulating configured statistic |

The next protocol lookup records referenced in the field sub-record table (Table 2) at bytes 28–31 are preferably organized as shown in Table 4:

TABLE 4

LOOKUP STRUCTURE RECORD

| Offset | Name | Description |
|---|---|---|
| 0–3 | Protocol | pointer to protocol description structure |
| 4–7 | Next Index | index of field in protocol description to parse next |
| 8–11 | Minimum | minimum acceptable value for this range |
| 12–15 | Maximum | maximum acceptable value for this range |
| 16–19 | okbits | selects even only, odd only, or all values in range |
| 20–23 | Translation | pointer to associated human language equivalent |

Lookup structures can be used for determining the next protocol control record to use, terminating protocol processing on illegal values, branching decisions for variable length headers or overlapping fields, and for translation of numeric values to mnemonic or written language equivalents. This ability to specify branches on field values allows protocols with multiple overlapping structures to be specified and parsed dynamically.

The vary field value records referenced in the field sub-record table (Table 2) at bytes 32–35 are preferably organized as shown in Table 5:

TABLE 5
VARY FIELD VALUE RECORD

| Offset | Name | Description |
|---|---|---|
| 0–3 | mask | mask for isolating field bits from 32-bit field |
| 4–7 | notmask | mask for isolating bits not in field |
| 8–11 | operand | value to apply to field bits (relative to field) |
| 12–15 | minvalue | minimum allowable value for field bits (relative to field) |
| 16–19 | maxvalue | maximum allowable value for field bits (relative to field) |

The checksum records referenced in the field sub-record table (Table 2) at bytes 36–39 are preferably organized as shown in Table 6:

TABLE 6
CHECKSUM RECORD

| Offset | Name | Description |
|---|---|---|
| 0–3 | verify | pointer to routine to verify protocol checksum |
| 4–7 | compute | pointer to routine to compute protocol checksum |

The filter criteria records referenced in the field sub-record table (Table 2) at bytes 40–43 are preferably organized as shown in Table 7:

TABLE 7
FILTER CRITERIA RECORD

| Offset | Name | Description |
|---|---|---|
| 0–3 | Index | index of this filter criteria (zero-based) |
| 4–7 | ChPtr | pointer to parent filter channel |
| 8–11 | Ranges | pointer to lookup structure containing all possible field values |
| 12–15 | Ptl | pointer to associated protocol definition for this criteria |
| 16–19 | Fld | pointer to associated field definition for this criteria |

The filter channel records referenced in the Filter Criteria record (Table 7) above at 4–7 are preferably organized as shown in Table 8:

TABLE 8
FILTER CHANNEL RECORD

| Offset | Name | Description |
|---|---|---|
| 0–3 | NextCriteriaIndex | index of next criteria that should be applied to this filter |
| 4–7 | TotalCriteria | number of criteria required to implement this filter |
| 8–11 | Criteria | pointer to array of TotalCriteria criteria structures |
| 12–15 | ChannelName | pointer to user supplied filter channel name |

Each configured filter consists of one or more filter criteria and the filter criteria may be organized into Filter Criteria records. The Filter Criteria records may refer to lookup structures which allow the filter criteria to determine from a field value the current state of the filter expression at each criteria. These states may include: PASS_FRAME (accept this frame) and FILTER_FRAME (discard this frame).

The NextCriteriaIndex field referenced in Table 8 above at bytes 0–3 is used to ensure that all filter expressions are applied in the required order. The Ptl and Fld fields at bytes 12–19 allow filter criteria to be associated with specific protocols and protocol fields. The lookup records referenced in the Filter Criteria record (Table 7) at bytes 8–11 are preferably organized as shown in Table 9:

TABLE 9
FILTER LOOKUP STRUCTURE RECORD

| Offset | Name | Description |
|---|---|---|
| 0–3 | Return Value | PASS FRAME, FILTER_FRAME value range result |
| 4–7 | Index | index of field in Filter Expression structure |
| 8–11 | Minimum | minimum acceptable value for this range |
| 12–15 | Maximum | maximum acceptable value for this range |
| 16–19 | Mask | selects EVEN, ODD or all values in range |
| 20–23 | Translation | pointer to associated human language equivalent |

The Route Table records referenced in the Field Sub-Records table (Table 2) at bytes 44–47 are preferably organized as shown in Table 10:

TABLE 10
ROUTE TABLE RECORD

| Offset | Name | Description |
|---|---|---|
| 0–11 | NetMask | mask for extracting 1 to 96 bits from protocol header route field |
| 12–15 | entries | number of entries in Route Table |
| 16–19 | Table | pointer to array of 'entries' Route Table entries |

The Route Table Entry records referenced in the table above at bytes 16–19 are preferably organized as shown in Table 11:

TABLE 11
ROUTE TABLE ENTRY RECORD

| Offset | Name | Description |
|---|---|---|
| 0–11 | DstNetAddr | Route Table Lookup Value (field value is compared with this) |
| 12–13 | DstFrameType | destination frame type (i.e., 802.3, FDDI, etc.) |
| 14–15 | DstInterface | destination interface number |
| 16–17 | MacHdrLen | length of MAC header and encapsulation to append to frame |
| 18–19 | DataLen | length of frame less MAC header and encapsulation |
| 20–21 | MinLen | minimum allowable frame size for this destination |
| 22–23 | MaxLen | maximum allowable frame size for this destination |
| 24–27 | MaxHdr | pointer to MAC header and encapsulation to append to frame |
| 28–31 | DataPtr | pointer to frame less any bits below the routing protocol header |

In Tables 1–11 the records of the protocol description and associated field, statistics, lookup, checksum, vary, route determination and filter records are shown as they appear when resident in memory. In the presently preferred embodiment, each of these protocol description records with its associated field, statistics, lookup, and filter record information is also written to a protocol specific protocol description file (PDF).

In the presently preferred embodiment, the following sequence of data is written to a PDF:

For the Protocol Control Record:

the length of the protocol name including NULL terminator, the name of the protocol, the total bit length of the protocol header, the number of fields required to describe records, the index of the field currently referenced, the display bit width, for each of the field records that describe the protocol header, a call is made to write the field related data (This sequence is described below).

if the pointer to the option control record is NULL, zero, if there are options, the length of the protocol option name including the NULL terminator, the option name, the option's protocol control record For the Field Record:

the flag indicating the value is the actual length of frame, the length of the field in bits, the byte offset from the start of the protocol header, the number of bits to left shift of the 32-bit field, the number of bits to right shift of the 32-bit field, the number indicating the display type, the flag indicating the value is the actual length of the protocol header, the reserved byte, the multiplier to apply to value prior to display, the flag indicating whether to byte swap the 32-bit value, the flag indicating that the field is to be displayed, the length of the field name including the NULL terminator, or zero if the pointer to the statistics structure/class is NULL, zero if the pointer to the statistics structure/class is not NULL, a call is made to write the statistics type if the pointer to the lookup structure/class is NULL, zero if the pointer to the lookup structure/class is not NULL, a call is made to write the lookup type, the number of lookups, and the lookup values The pointer to vary field, pointer to checksum, pointer to filter, and pointer to route determination are handled similarly.

In the presently preferred embodiment, the initialization of the system includes a determination of the presence of PDF files and the extraction of the protocol and associated control record information from all of the PDF files found. The number of PDF files is determined, and a ProtocolList is constructed consisting of a sorted vector of protocol records at least the size of the number of PDF files found. The name of each protocol record found is inserted in the ProtocolList. The PDF files are then read to memory in the sequence described above for the PDF file writing. The lookup records that indicate a next protocol are associated with the appropriate entries in the ProtocolList.

Two simple protocol descriptions are provided in Tables 12 and 13 (below) to assist in the description of the system of the present invention. The Ethernet Protocol specification shown below is a simplification of an actual Ethernet protocol header.

TABLE 12

ETHERNET v2.0 PROTOCOL SPECIFICATION

| 0 | 15 | 23 | 47 |
|---|---|---|---|
| | Destination Hardware Address | | |
| | Source Hardware Address | | |
| Ethernet Protocol Type | | | |

| | |
|---|---|
| Destination Hardware Address | - destination hardware station address (48 bits) |
| Source Hardware Address | - source hardware station address (48 bits) |
| Ethernet Protocol Type | - upper layer protocol designator (16 bits) 0 × 8888 = GP |

The Ethernet protocol definition described above specifies only one possible upper level protocol, the Generic Protocol (GP) which is indicated by placing a hexadecimal 0×8888 value in the protocol type field. The Generic Protocol (GP) specification shown below in Table 13 has been fabricated to provide examples of different types of field functionalities found in actual network protocols.

TABLE 13

GENERIC PROTOCOL (GP) SPECIFICATION

| 0 | 7 | 15 | 23 | 31 |
|---|---|---|---|---|
| Version No. | HeaderLen | Frame Type | Frame Length | |
| Checksum | | | Control | Hop Count |
| Src Socket | | | Dst Socket | |
| Src Address | | | | |
| Dst Address | | | | |
| 0–320 optional field bits | | | | |

| | |
|---|---|
| Version Number (4 bits) | - software version number |
| HeaderLen (4 bits) | - length of GP header in 32 bit words.<br>0–4 = illegal<br>5 = No Optional field,<br>6–15 = 32–320 bits of options |
| Frame Type (8 bits) | - upper level protocol identifier<br>0 = Unknown<br>1 = GP1<br>2 = GP2<br>3–255 = Unknown |
| Frame Length (16 bits) | - frame length in bytes including header |
| Checksum (16 bits) | - Checksum of header including options |
| Control (8 bits) | - reserved (must be zero) |
| Hop Count (8 buts) | - Count of number of networks trraversed |
| Src Socket (16 bits) | - Socket of Upper-layer protocol sender |
| Dst Socket (16 bits) | - Socket of Upper-layer protocol receiver |
| Src Address (32 bits) | - Sender protocol address |
| Dst Address (32 bits) | - Receiver protocol address |

The GP options have two possible formats. Type 1 consists of a single 8-bit option type field containing an option type value. Type 2 contains the 8-bit option type field, but also contains an 8-bit option length field to allow implementation of variable length options in the GP. Two type 1 options and one type 2 option defined in the GP specification are shown below in Table 13:

TABLE 13

| | | |
|---|---|---|
| End of Option List | (8 bits) | Indicates end of options list. Consists of an 8-bit option type field with value 0. Necessary only for list that does not end on 32-bit boundary. |

TABLE 13-continued

| | | |
|---|---|---|
| No operation | (8 bits) | Performs no function. Consists of an 8-bit option type byte with value 1. Used for alignment of other GP options. |
| MinMax Size | (32/48 bits) | Allows minimum and maximum allowable frame lengths to be specified. Consists of an 8-bit option type field with value 2, an 8-bit option length field, and 16-bit minimum frame length field, and an optional 16-bit maximum frame length field. If the maximum frame length is specified, the option length field will have value 4, otherwise it will have value 6 specified in units of 8-bit bytes. |

Describing the flow charts of FIGS. 11–16 requires the definition of several variables. These variables (described in Table 14 below) are used to implement and monitor the current control logic state of a network interface system in accordance with the present invention:

TABLE 14-continued

| | |
|---|---|
| HeaderLen | Size in bits of protocol header being parsed |
| ParseLvl | Zero based protocol level in ISO reference model of protocol being parsed (current protocol) |
| ParseList | Array of pointers to protocol headers in frame being parsed (only 0 to (ParseLvl-1) are valid) |
| SrcIntf | Index of interface on which frame being parsed was received (useful for bridging applications and interface operations) |
| IntfTypes | Array of values defining the type of each interface in the network system (useful for bridging operations and type specific operations) |

Network frames contain one or more protocol headers, an optional number of data bits, and an optional number of pad bits. Frame bits up to the frame length extracted during parsing for which no protocol description exists are considered data. Bits beyond the frame length extracted during parsing are considered to be pad. Two network frames are provided as examples to be used during discussion of the control logic of the present invention:

Frame 1 shown below has a hardware length of eighty-two 8-bit bytes and consists of a fourteen byte Ethernet header, a twenty byte GP header with no option bytes, and forty-eight bytes of application data. No hardware pad is required because the frame length exceeds the Ethernet minimum of sixty bytes.

Frame (1)

| | | | | | | | | | | | | | | | | | | | | | | | | | | | |
|---|---|---|---|---|---|---|---|---|---|---|---|---|---|---|---|---|---|---|---|---|---|---|---|---|---|---|---|
| (1) | 08 | 00 | 00 | 00 | 00 | 03 | 08 | 00 | 00 | 00 | 00 | 04 | 88 | 88 | | | | | | | | | | Ethernet Header | (14) |
| (2) | 35 | 00 | 00 | 44 | B1 | 5F | 00 | 01 | 08 | 00 | 01 | 47 | 01 | 02 | 03 | 04 | 05 | 06 | 07 | 08 | | | | GP Header | (20) |
| (3) | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | Data | (24) |
| (4) | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | Data | (24) |

Frame 2 shown below has a hardware length of sixty 8-bit bytes and consists of a fourteen byte Ethernet header, a twenty-eight byte GP header including eight option bytes, and eighteen bytes of pad to achieve the sixty byte Ethernet minimum frame length requirement.

Frame (2)

| | | | | | | | | | | | | | | | | | | | | | | |
|---|---|---|---|---|---|---|---|---|---|---|---|---|---|---|---|---|---|---|---|---|---|---|
| (1) | 08 | 00 | 00 | 00 | 00 | 01 | 08 | 00 | 00 | 00 | 00 | 02 | 88 | 88 | | | | | | Ethernet Header | (14) |
| (2) | 37 | 03 | 00 | 2A | FF | FF | 00 | 05 | 08 | 00 | 01 | 00 | 01 | 02 | 03 | 04 | 05 | 06 | 07 | 08 | GP Header | (20) |
| (3) | 01 | | | | | | | | | | | | | | | | | | | | GP NoOp Option | (1) |
| (4) | 02 | 04 | 00 | 00 | | | | | | | | | | | | | | | | | GP MaxSizeOpt | (4) |
| (5) | 00 | | | | | | | | | | | | | | | | | | | | GP EOL Options | (1) |
| (6) | 00 | 00 | | | | | | | | | | | | | | | | | | | GP Option Pad | (2) |
| (7) | 00 | 00 | 00 | 00 | 00 | 00 | 00 | 00 | 00 | 00 | 00 | 00 | 00 | 00 | 00 | 00 | 00 | 00 | | | Frame Pad | (18) |

TABLE 14

| | |
|---|---|
| FramePtr | Pointer to start of network frame being parsed |
| HwLen | Bit length of network frame as reported by input device |
| ParseLen | Number of bits parsed in the current network frame |
| Current Protocol | Pointer to protocol description control record in use |
| CurField | Index of field in CurrentProtocol being parsed |
| PasrePtr | Pointer to start of protocol header in frame being parsed |
| FrameLen | Number of meaningful bits in the current network frame |
| ProtoParse Len | Number of bits parsed in the current protocol header |

A flow chart is provided for each of the major control logic components of the present invention. The flow chart shown in FIG. 11 outlines ParseFrame control logic in accordance with the present invention and shows how successive protocol headers are parsed, and how remaining information is parsed as application data and frame pad. The flow chart in FIG. 12 outlines ParseProtocol control logic in accordance with one form of the present invention and shows how fixed and optional fields may be parsed in a selected protocol. The flow chart shown in FIG. 13 outlines ParseFields control logic in accordance with the present invention and shows how decisions are made and operations performed on extracted field values. The flow chart shown in FIG. 14 outlines ValidateValue control logic in accordance with the present invention and shows how branching, next protocol determination, and validity decisions are made with extracted field values. The flow chart shown in FIG. 15 outlines ApplyFilter control logic in accordance with one form of the present invention and shows how filter criteria are applied to fields in network frames. The flow chart shown in FIG. 16 outlines GetValue control logic in accordance with one form of the present invention and shows how field values are extracted from network frames. These six components of the control logic of a network interface system in accordance with the present invention are described in detail below.

Figure 13B:
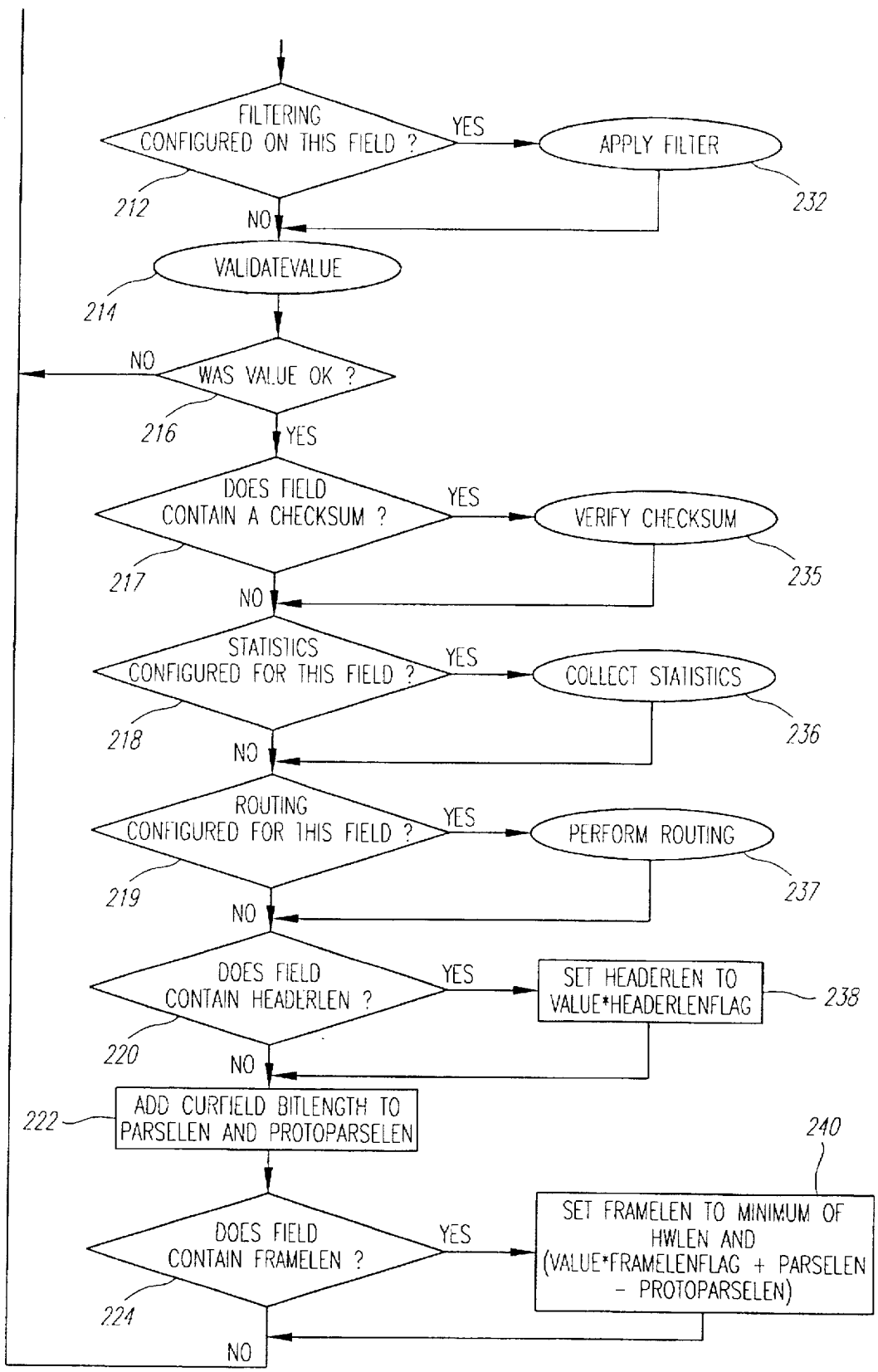
FIG. 13 is a flow chart of the field parsing control logic in accordance with one form of the present invention.
Figure 16:
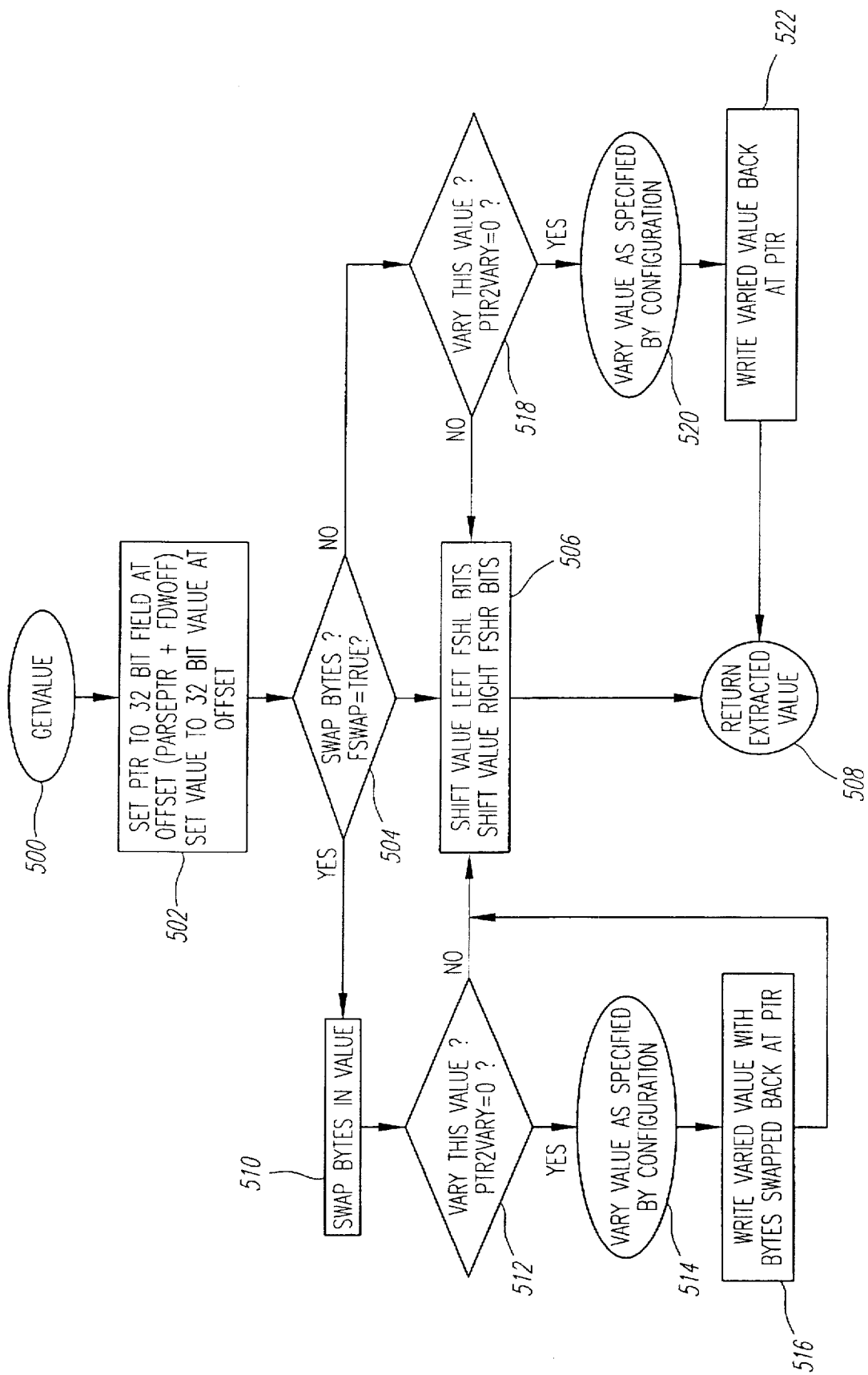
FIG. 16 is a flow chart illustrating field value extraction and varying control logic in accordance with one form of the present invention.

Referring now to FIG. 13, a value is extracted by the GetValue control logic (shown in FIG. 16) of the system (at 210) for each configured field that is relevant to the current network frame. As shown in FIG. 16, the fdwoff value is added to ParsePtr to locate and extract a 32-bit value (at 502) containing the field value, which is then byteswapped (at 510) if the fswap field is TRUE. If the ptr2vary field is NULL (at 512 or 518), indicating that the value does not need to be modified or varied, the field value is extracted (at 506) by shifting the 32-bit value left fshl bits and then right by fshr bits to eliminate any extraneous bits. If the ptr2vary field is non-NULL, the extracted 32-bit value is modified using the configured method (at 514 or 520) and the resulting 32-bit value overwrites the extracted 32-bit value (at 516 or 522). If the extracted value was byteswapped (at 510), the modified value is swapped back (at 516) prior to overwriting the original value. The extracted value is returned (at 508) by the GetValue control logic.

It will be appreciated by those skilled in the art that the system of the present invention can handle different machine endian architectures (at 210) by rearranging the bit and byte order of the extracted 32-bit network frame value to match the target hardware architecture, and can be adapted easily to RISC based architectures where all memory accesses must be aligned in some fashion.

If the GetValue control logic was about to extract a value for the GP HeaderLen field from frame (2), ParsePtr would point at the first value of line 2, from FIG. 5a, fdwoff would be 0, fshl would be 4, and fshr would be 28, so that 32-bits of data would be extracted (at 502) and, possibly, byteswapped (at 510) to obtain a hexadecimal value equal to 0×3703002A.

In binary notation this is: 0011 0111 0000 0011 0000 0000 0010 1010

Shifting left 4 bits (at 506) yields: 0111 0000 0011 0000 0000 0010 1010 0000

Shifting right 28 bits (at 506) yields: 0000 0000 0000 0000 0000 0000 0000 0111

Which in decimal notation is: 7

Therefore, the actual length of the GP header in frame (2) is seven 32-bit words, which is 28 bytes or 224 bits.

Although the presently preferred embodiment of the system of the present invention is designed to handle a maximum field width of 32 bits, it will be appreciated by those skilled in the art that the system may be designed to handle any required maximum field width, and is particularly efficient where the maximum field width in matches the underlying hardware architecture. It will also be appreciated by those skilled in the art that it is possible to divide larger protocol fields into sub-fields as demonstrated by the Ethernet protocol field descriptions shown in FIG. 4a where the 48-bit hardware address fields have each been defined as two 24-bit sub-fields.

Figure 14:
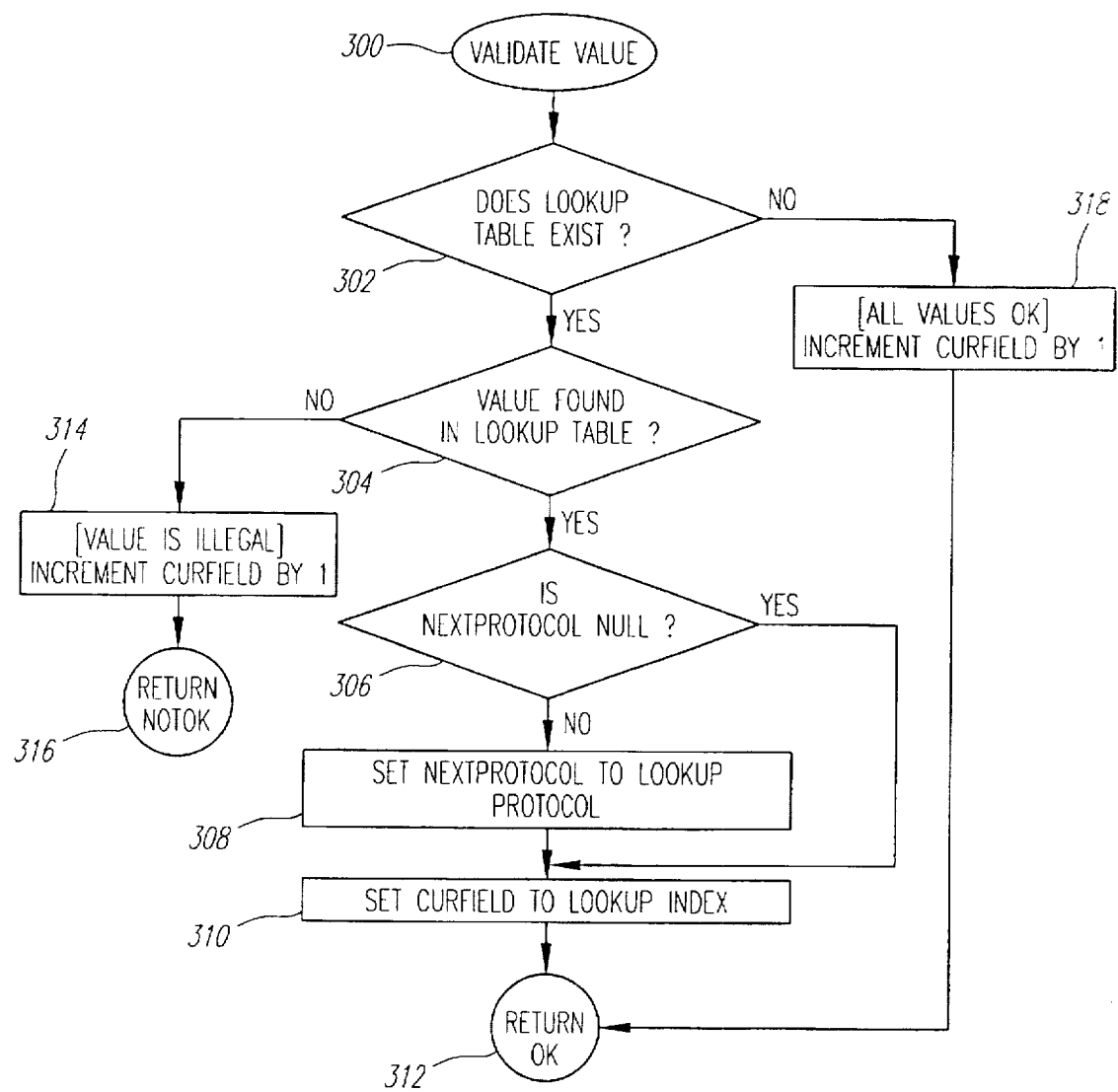
FIG. 14 is a flow chart representing value verification, error checking, next protocol and branch determination control logic in accordance with one form of the present invention.

The ValidateValue control logic shown in FIG. 14 is performed on each extracted field value by the ParseFields control logic (at 214) shown in FIG. 13. Each field may have an associated lookup structure reference containing one or more values and/or ranges of values that have a particular meaning for that field.

If no lookup structure is configured for a particular field, all values are deemed to be valid (at 318 and 312), which causes parsing to continue with the next sequentially defined field of the current protocol description.

If a lookup structure exists for a particular field but the extracted value is not found therein (at 314 and 316), parsing still continues with the next defined field of the current protocol. However, the value is considered invalid.

Values or ranges of values found in configured lookup structures are considered to be valid. The Prot and NextIndex values associated with a value or range found are used to specify NextProtocol, the protocol description (at 308) to be used after current protocol header parsing is completed, and the index of the next field (at 310) is used to determine where parsing of the current protocol will continue after the current field. The first valid field parsed in a protocol that specifies the NextProtocol has precedence over all subsequent NextProtocol specifiers (at 306).

The ValidateValue control logic returns an updated CurField value (at 312 and 316) together with a valid/invalid indication, and where indicated (at 308) may return an updated value for NextProtocol.

Using value 0×8888 as an example, if the ValidateValue control logic is applied to the Ethernet Type field and associated lookup structure shown in FIGS. 4a and 4d respectively, the lookup structure would be found (at 302), the value will be found in it (at 304), the associated Protocol field found with the range containing 0×8888 value will be used to update the NextProtocol variable (at 308) if it is NULL (at 306), and the associated Next Index field will be used to update the CurField variable.

Using FIG. 5c as an example, it may be seen how values may be used to continue parsing at different locations in the current protocol description. In this case, value 0×02 for the Frame Type field causes Checksum field processing to be skipped.

Referring back to the ParseFields control logic shown in FIG. 13, the ParseFields control logic parses the fields in each protocol header contained in a particular network frame by using field values obtained in accordance with information specified in associated protocol descriptions. The ParseFields control logic is applied for each protocol description required for a particular network frame. If the ParseFields control logic were applied to the exemplary frame, "Frame (1)," described above, the network interface system 10 of the present invention would apply the ParseFields control logic with the protocol descriptions for the Ethernet protocol shown in Table 12, the GP shown in Table 13, and an unspecified Data protocol description.

The ParseFields routine is entered (at 200) with ParsePtr pointing at the start of a protocol header in a particular network frame and CurrentProtocol set to an appropriate protocol description. Parsing starts at Protocol bit and field zero when CurField and ProtoParseLen are cleared (at 202), also, HeaderLen is set to the configured protocol control record NumBits value, and LocalProto, the local next protocol return value variable is cleared. Using the Ethernet protocol description shown in FIG. 4 as an example, HeaderLen would be set to 112 bits.

The control loop (at 204 through 224) continues until the last field has been parsed (at 206), all bits in the header have been parsed (at 208), or all bits in the frame have been parsed (at 209).

For each field a value is retrieved by the system (at 210). If there is a filter criteria for the field it is applied (at 232)

by the ApplyFilter control logic. The System Filter Status is set to FILTER_FRAME and NextCriteriaIndex is set to zero for every configured filter channel prior to the start of frame processing and after each frame is processed (at 124 in FIG. 11).

Referring now to the overall system filter channel control structure shown in FIG. 10, and using the filter expression shown below as an example:

if ((the Ethernet *Dst* Vendor Address is 0x08*FFFF* AND the Ethernet *Dst* Station Address is 0x334455) OR (the *GP* Frame Type is 1 OR the *GP* Frame Type is 2))

keep this network frame we can divide the expression into three distinct filter criteria:

(0) if ((the Ethernet Dst Vendor Address is 0×08FFFF (1) if the Ethernet Dst Station Address is 0×334455

(2) if the GP Frame Type is 1 OR the GP Frame Type is 2

FIG. 10(a) shows an example Filter channel structure for the expression shown above and refers to the three Filter Criteria Records of FIG. 10(b) that implement the three filter criteria shown above and refer respectively to FIGS. 10(c), 10(d) and 10(e) which implement the three criteria as lookup structures.

Figure 15:
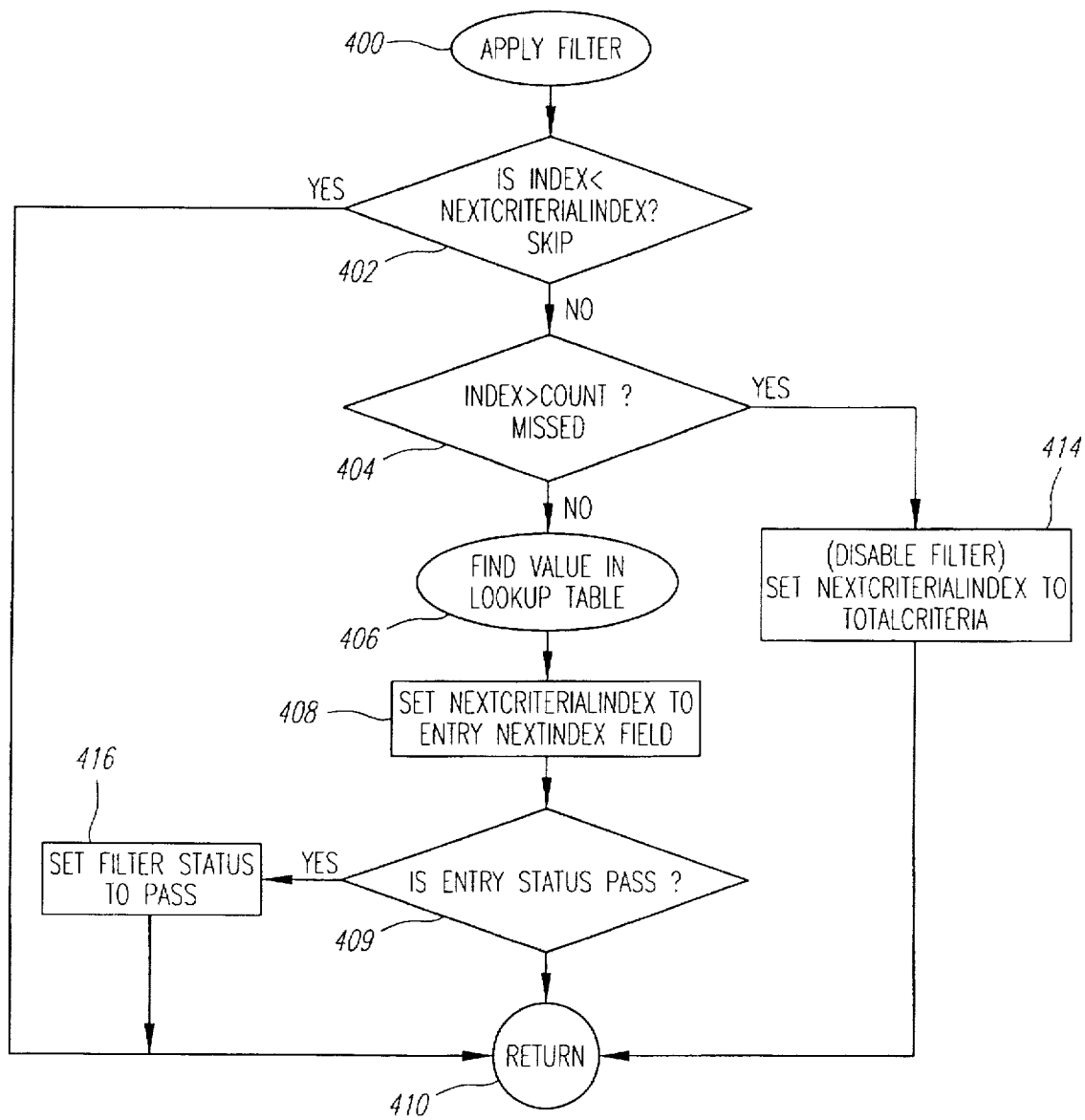
FIG. 15 is a flow chart representing field filtering control logic in accordance with one form of the present invention.

Referring now to FIG. 15, after the ApplyFilter control logic is entered (at 400), the Index of one of the filter criteria records shown in FIG. 10(b) is computed with NextCriteriaIndex (at 402 and 404) for the associated filter channel shown in FIG. 10(a).

If Index is less than NextCriteriaIndex (at 402) it indicates that this filter criteria does not need to be evaluated. This may occur because a filter channel has been satisfied and NextCriteriaIndex has been set to TotalCriteria to disable further filter processing.

If Index is greater than NextCriteriaIndex (at 404) this indicates that a filter criteria was skipped in the evaluation of this filter channel which invalidates the filter result. In this case, further filter evaluation is disabled (at 414) by setting NextCriteriaIndex to TotalCriteria and ApplyFilter returns to the caller.

If Index and NextCriteriaIndex are equal, the field value is found (at 406) in the associated lookup table, NextCriteriaIndex is updated with the associated NextIndex value and if the associated return value status is PASS_FRAME, the System Filter Status is updated to PASS_FRAME. In this preferred embodiment, the range of possible values for a field must be fully covered. Similarly, in the preferred embodiment a frame will be completely parsed for statistics gathering.

Criteria (0) cannot be used to determine a PASS/FILTER_FRAME lo result for the filter expression above because it must be logically AND'ed with criteria (1). This is illustrated in FIG. 10b, where every value results in no change to the status. The logical AND with criteria (1) is implemented using the NextIndex value. If criteria (0) is FALSE then NextIndex is 2 which causes criteria (1) to be skipped, otherwise NextIndex is 1.

Criteria (1) when TRUE can be used to determine that the filter expression is TRUE because it is not evaluated unless criteria (0) is also TRUE, and the filter expression is the result of ((0) and (1)) or (2). If criteria (2) is FALSE then a PASS/FILTER_FRAME result cannot be determined for the filter expression. This is illustrated by FIG. 10c, where the criteria value results in a PASS_FRAME status, and every other value results in no change to the status. The filter expression Count value is reset on completion of frame processing.

Criteria (2) when TRUE can be used to determine that the filter expression is TRUE because it is logically OR'ed with the result of the first two criteria.

It should be noted that the system of the present invention will collect statistics on all fields evaluated regardless of the decision to pass or filter the frame, which may not be acceptable in some instances. It will be appreciated by those skilled in the art that the system of the present invention may be implemented as sequential parsing loops, so that filtering decisions may be made prior to the application of statistics or other field operations.

. It will be appreciated by those skilled in the art that the system of the present invention offers significant advantages over traditional filtering methods by allowing filtering criteria to be specified for any subset of bits in any field, by allowing criteria to be applied to every instance of a field that appears more than once in a network frame, and by providing a simple method for easily specifying ranges of values.

Returning again to FIG. 13 after applying a filter criteria, the extracted value is processed by the ValidateValue control logic (at 214), which updates the NextProtocol and CurField variables and returns a valid/invalid value indication. If ValidateValue returns invalid, parsing of the current field stops (at 216) and restarts with the updated CurField value (at 204), otherwise each configured parsing operation is applied based on the extracted value.

The statistics entity of the field sub-record may be used to indicate categories of statistics to be maintained for each protocol header field (at 218 and 236). Details about mechanisms for collecting statistics are not relevant to the present discussion. However, it will be appreciated by those skilled in the art that the addition of various classes of statistics such as field counters, summing of field contents, and arrays of counters/sums based on field contents may be used in accordance with the present invention. Using FIG. 5a as an example, it would be possible to configure the FrameLength field to accumulate an array of counts for each possible field value. From this array, the distribution of GP frames sizes is immediately available, and the length of all GP frames and each frame size may be computed.

Although checksum verification/computation (at 217 and 235) and route determination capabilities (at 219 and 237) are not described in detail in FIG. 13, those skilled in the art will recognize that a system in accordance with the present invention may be configured easily to implement those capabilities. Further, exemplary software listings for implementing these capabilities are provided in the Appendix which is attached hereto and incorporated herein by reference. Moreover, upon review the listings in the Appendix entitled csum.asm, checksum.hpp, route.cpp and route.hpp, those skilled in the art will appreciate that the ability to configure IP, TCP, UDP and IPX checksum capabilities may readily be incorporated into a system in accordance with the present invention. The same is true for a general purpose 16 bit ones complement checksum capability. Finally, those skilled in the art will appreciate that the system of the present invention may be configured in virtually infinite ways to implement virtually any desired checksum capability or, indeed, any desired data manipulation function.

Although in the preferred form the Verify checksum control logic is integrated into the ParseFields control logic (at 217 and 235), the result is not used because processing of frames with bad checksums is device dependent. For example, frames with bad checksums would be counted and saved by a protocol analyzer, while a routing device would count and discard them.

An ability to route frames based on values contained in fields of up to 96 contiguous bits is also demonstrated in the software listings included in the Appendix, and those skilled in the art will recognize that the 96 bit limit may be changed easily to allow for proper handling of protocols with route determination fields longer than 96 bits.

Moreover, those skilled in the art with appreciate that the system of the present invention may be augmented to support virtually any field based operations through modification of the ParseFields control logic loop (at 204–224). For example, it is believed that field based encryption and decryption operations may be added to the system of the present invention with minimal effort.

The HeaderLength field of a protocol description sub-record when non-zero is used to indicate that the extracted value of the current field may be used to compute the length of the current protocol header. The extracted value when multiplied with the configured HeaderLength field value yields the length of the protocol header in the current network frame (at 238). The HeaderLength field is configured to be 32 for the FrameLength field of the GP description shown in FIG. 5a. If HeaderLength is used together with the HeaderLen value extracted from frame (2), an actual GP header length of 224 bits (32*7) is calculated. Because the fields defined in FIG. 5a add up to only 160 bits, it will then be possible to determine that the (224–160) or 64 bits of optional fields exist in frame (2).

For each field with a valid value, the BitLength field is added to ProtoParseLen, the number of bits parsed in the current protocol, and ParseLen, the number of bits parsed in the network frame (at 222).

The FrameLength field of a protocol description sub-record when non-zero is used to indicate that the extracted value of the current field may be used to compute the length of the current network frame. The extracted value when multiplied with the configured FrameLength value yields the number of meaningful bits in the current frame (at 240). The FrameLength field is configured to be 8 for the FrameLength field of the GP description shown in FIG. 5a. If FrameLength is used together with the FrameLen value extracted from frame (1), an actual frame length of 336 bits is calculated (8*42). Because the hardware length of frame (1) is 480 bits (8*60 bytes), it is now possible to determine that the last ((480–366) bits) of frame (2) is pad, added to the frame in this case, to achieve the required Ethernet minimum length of (8*60 bytes). In a preferred form, the length computed for the frame is verified against the length provided by the hardware, and the minimum of the two values is be used as FrameLen.

If every field in the current protocol has been parsed (at 206), or every bit in the current protocol header has been parsed (at 208), or every bit in the current frame has been parsed (at 209), parsing of the current protocol terminates. If LocalProto is NULL (at 225) when parsing of the current protocol terminates, ParseProtoLen is added to ParsePtr (at 228) so that it points to the start of the next protocol header in the frame. If LocalProto is not NULL (at 225) when parsing of the current protocol terminates and there are unparsed header bits remaining (at 226), ParseLen and ProtoParseLen are adjusted to account for each unparsed header bit (at 227) before adding ProtoParseLen to ParsePtr (at 228). In every case, ParseFields control logic returns LocalProto (at 230).

Referring now to FIG. 11, the ParseFrame control logic of the present invention, network frames are composed of one or more protocol headers which in turn are composed of one or more predefined contiguous bit fields. The ParseFrame control logic systematically parses through each network frame (at 104 to 108 and 128) until all known protocol headers have been parsed. Any remaining frame bits are parsed as application data (at 110, 112 and 130) and/or pad data (at 114, 116 and 132).

Figure 12:
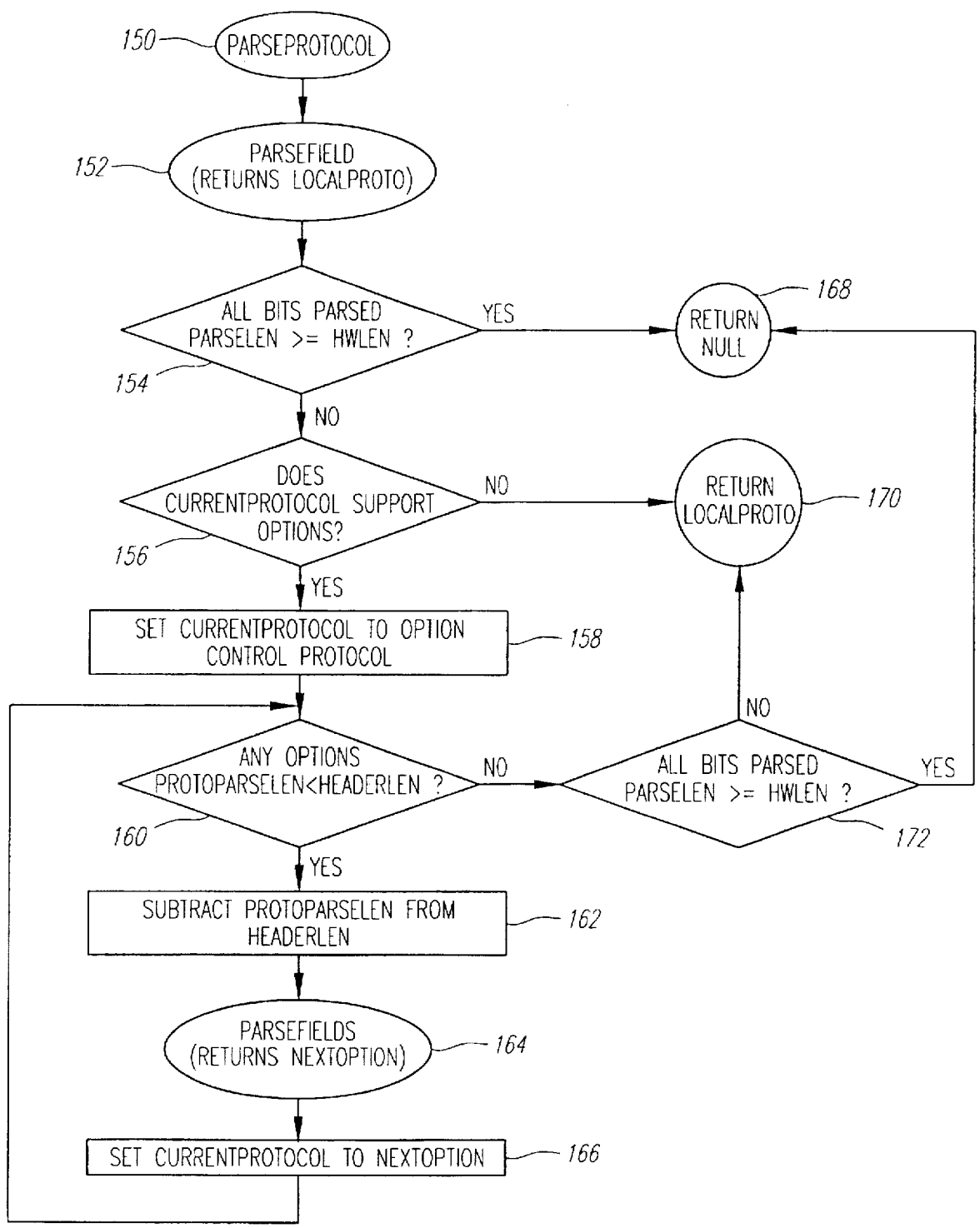
FIG. 12 is a flow chart illustrating protocol parsing control logic in accordance with one form of the present invention.

Referring now to FIG. 12, ParseProtocol control logic where all fixed and optional protocol fields are parsed is entered (at 200) with ParsePtr and ParseLen initialized from prior processing. All protocol fields that are fixed in location are parsed (at 152). If all bits in the frame are parsed (at 154) after parsing fixed fields, frame parsing is complete and ParseProtocol returns NULL (at 168). If there are more bits in the frame to parse and the current protocol description supports optional fields (at 156) and the current frame contains optional fields (at 160) they are parsed (at 160 to 166) using the current protocol option control protocol description as a starting point (at 158). Once all options are parsed (at 172) ParseProtocol will return NULL (at 168) if all bits in the frame have been parsed or will return LocalProto (at 170) if more bits remain to be parsed.

Referring again to FIG. 11, once the system has received a network frame (at 100), defined by an interface number (SrcIntf), a frame location (FramePtr) and a hardware length (HwLen), the frame is resolved into its protocol and field components using the system of the present invention.

Using the exemplary frame, "Frame (2)," described above as an example, the system (at 102) in FIG. 11 would obtain from the receiving network interface device SrcIntf, the receiving interface number, FramePtr, a pointer to the frame, and HwLen, the hardware frame length. The hardware length of frame (2) is 480 bits. ParseLen, the number of bits in the frame that have been parsed, ParseLvl and CurField, the index of the protocol field being processed are reset to zero, and CurrentProtocol, is set up with the initial protocol description structure of the receiving interface number which for frame (2) is the Ethernet Protocol description defined in FIGS. 4–4d. FrameLen is set to the value of HwLen, and ParsePtr is set to the value of FramePtr.

Each field in the Ethernet Protocol description as shown in FIG. 4a is parsed (at 106) using the ParseProtocol control logic shown in FIG. 13.

The ParseProtocol control logic updates ProtoParseLen, the number of bits parsed in the CurrentProtocol, HeaderLen, the protocol header size determined during parsing, and returns NextProtocol, a reference to the next applicable protocol description structure to use during parsing. ParseProtocol also updates ParsePtr and ParseLen by adding ProtoParseLen to them. If NextProtocol is NULL, the remaining frame bits will be treated as Data and/or Pad bits.

After the Ethernet protocol fields in frame (2) are parsed (at 106) by the ParseProtocol control logic shown in FIG. 13, HeaderLen, ParseLen and ProtoParseLen will be 112 bits, NextProtocol will refer to the GP shown in FIGS. 5–5(e), and ParsePtr will point at the start of line 2 in frame (2). CurrentProtocol will be updated with the NextProtocol value of GP (at 130) and the GP fields in frame (2) are parsed (at 106) by the ParseFields control logic shown in FIG. 13, which will update HeaderLen and ProtoParseLen to be 160 bits, and return NextProtocol as NULL. ParsePtr will point at the start of line 3 in frame (2), and ParseLen will be updated to 272 bits.

Referring now to FIG. 12, if a CurrentProtocol such as GP shown in FIGS. 5–5e supports optional fields, which is indicated by the Options field of the control record, then any options in the network frame are sequentially parsed (at 160–166) using the ParseFields control logic (at 164) until ProtoParseLen, the number of bits parsed in the protocol header is equal to HeaderLen, the protocol header size determined during parsing with the original protocol description (at 152).

Using the exemplary frame, "Frame (2)," described above as an example, after the GP fields are parsed (at 152), HeaderLen will be updated to 224 bits, while ProtoParseLen will be updated to 160 bits, which indicates the presence of (224–160) bits of optional fields (at 160).

Every protocol description with optional fields will have a master protocol option description, and one option protocol description for each supported option. Using the GP protocol control record shown in FIG. 5 as an example of how optional fields might be described, the Options field will refer to a master option control record similar to FIG. 6. The master option control record will contain one field (see FIG. 6a) that does not contribute to the number of bits parsed (BitLength zero) with an associated lookup structure (see FIG. 6b) for each possible option. Using FIG. 6b as an example, each defined option refers to an appropriate protocol option description. The first field of each option description has an associated lookup structure (see FIGS. 7b, 8b, and 9b) that refers back to the master option control record. FIG. 9a shows how optional fields with variable length may be handled by computing the frame length.

Referring now to FIG. 13, in a preferred form the Option Type field in a frame is examined twice, once with the master protocol option description and once with the appropriate option protocol description. If an unknown option is encountered (any value between 0×03 and 0×ff inclusive for FIG. 6b), ParseLen, ProtoParseLen, and ParsePtr are updated (at 227 in FIG. 13) to skip any remaining options and parsing of the frame continues with the LocalProto protocol description returned (at 230).

Referring again to FIG. 12, and using the GP control record shown in FIG. 4 as an example, the system would determine (at 156) that the CurrentProtocol supports options and (at 158) will update CurrentProtocol to the master option descriptor of FIG. 6. The master option control record has one field shown in FIG. 6a, which is used to select the appropriate option protocol description structure to use. The lookup structure shown in FIG. 6b allows option descriptions to be associated with option type values extracted from network frames. The system (at 160–166) will parse one option at a time in the current network frame until all options are parsed.

Before each option is parsed, the number of bits parsed using the previous option protocol control record is subtracted from HeaderLen (at 162). The ParseFields control logic is alternately processed (at 164) with the master protocol option control record, and an appropriate option control record. The CurrentProtocol is updated (at 166) with the NextOption value returned by ParseFields, and the loop is re-entered (at 160).

Using the exemplary frame, "Frame (2)," described above as an example with ParsePtr pointing at line 3, and CurrentProtocol pointing at the GP master option description shown in FIG. 6, it may be seen how a NumBits value of zero prevents the master option description from contributing to the number of bits parsed (at 162), and how ParseFields and ValidateValue use the master option description field to select an appropriate GP option description structure from the lookup structure of FIG. 6b. For frame (2), the first option byte at line 3 contains value 1, which causes the GP NoOp option description structure shown in FIG. 8 to be selected (at 166). The NoOp NumBits value of 8 is added to ProtoParseLen (at 162), and the single field defined in FIG. 8a is parsed at 164. In a preferred form, each option description structure must have a field with an associated lookup structure that is always processed and refers back to the master option description structure.

Thus, for "frame (2)" the option processing control loop (at 160 through 166) is alternately applied with the description structures of FIG. 6 and FIGS. 8, 9, and 7. The GP End Of List Option does not refer back to the master option description because it indicates an end to option processing. Any remaining option bits are assumed to be pad and are disregarded so that the check for more options (at 160 in FIG. 12) will fail and return to frame protocol parsing (at 108 in FIG. 11).

Once all options have been parsed in frame (2) or the system (at 160) determines that the current frame has no optional fields as in frame (1), the system control logic (at 168 or 170) will return to the main parsing loop (at 108 in FIG. 11).

While the invention of this application is susceptible to various modifications and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

What is claimed is:

1. A system for manipulating data transmitted over one or more data communications networks, said system comprising:

a logic control module capable of accessing a plurality of programmably configurable protocol descriptions stored in a memory, said programmably configurable protocol descriptions each including a protocol control record and at least one field sub-record for defining a selected portion of a network protocol to be manipulated and a plurality of rules for manipulating said portion of said protocol;

said logic control module including frame and protocol header length determining logic, statistics gathering logic, verification and error checking logic, filtering logic, next protocol determining logic, routing logic and output formatting logic for and controlling, based upon said programmably configurable protocol descriptions, a series of data manipulation functions to be implemented by said system.

2. A protocol analyzer comprising:

a logic control module capable of accessing a plurality of programmably configurable protocol descriptions stored in a memory, said programmably configurable protocol descriptions each including a protocol control record and at least one field sub-record for defining a selected portion of a network protocol to be analyzed and a plurality of rules for conducting an analysis of said portion of said protocol;

said logic control module including frame and protocol header length determining logic, statistics gathering logic, verification and error checking logic, filtering logic, and next protocol determining logic for defining and controlling, based upon said programmably configurable protocol descriptions, a series of parsing, filtering, statistics gathering and display functions implemented by said protocol analyzer.

3. A machine implemented process for parsing data transmitted over a data communications network, said process comprising the steps of:

storing at least one programmably configurable protocol description in a memory, said at least one programmably configurable protocol description comprising a protocol control record and at least one field sub-record for defining a plurality of characteristics of said data transmitted over said data communications network;

retrieving said at least one protocol description from said memory; and providing said at least one protocol description to a logic control module, said logic control module, upon receiving said at least one protocol description, being configured to parse data received from said data communications network based upon said characteristics defined by said protocol description.

4. The process of claim 3, wherein a plurality of programmably configurable protocol descriptions are stored in said memory, and wherein said programmably configurable protocol descriptions are selectively retrieved from said memory in response to selected data sequences received from said data communications network.

5. A machine implemented process for filtering data transmitted over a data communications network, said process comprising the steps of:

storing at least one programmably configurable protocol description in a memory, said at least one programmably configurable protocol description comprising a protocol control record and at least one field sub-record for defining a plurality of characteristics of said data transmitted over said data communications network;

retrieving said at least one protocol description from said memory; and providing said at least one protocol description to a logic control module, said logic control module, upon receiving said at least one protocol description, being configured to filter data received from said data communications network based upon said characteristics defined by said protocol description.

6. The process of claim 5, wherein a plurality of programmably configurable protocol descriptions are stored in said memory, and wherein said programmably configurable protocol descriptions are selectively retrieved from said memory in response to selected data sequences received from said data communications network.

7. A machine implemented process for routing data transmitted over a data communications network, said process comprising the steps of:

storing at least one programmably configurable protocol description in a memory, said at least one programmably configurable protocol description comprising a protocol control record and at least one field sub-record for defining a plurality of characteristics of said data transmitted over said data communications network;

retrieving said at least one protocol description from said memory; and providing said at least one protocol description to a logic control module, said logic control module, upon receiving said at least one protocol description, being configured to route data within said data communications network based upon said characteristics defined by said protocol description.

8. The process of claim 7, wherein a plurality of programmably configurable protocol descriptions are stored in said memory, and wherein said programmably configurable protocol descriptions are selectively retrieved from said memory in response to selected data sequences received from said data communications network.

9. A network interface system comprising:
at least one network interface unit for communicating with a data communications network;
at least one memory coupled to said network interface unit, said memory being configured to store a plurality of network data files and a plurality of programmably configurable protocol descriptions; and
a logic control module coupled to said at least one network interface unit and to said at least one memory, said logic control module having the capability to selectively retrieve one or more of said programmably configurable protocol descriptions from said memory and to implement a selected data manipulation function in a manner defined by said one or more retrieved protocol descriptions.

10. The network interface system of claim 9, wherein said logic control module comprises a microprocessor and a computer program which may be executed by said microprocessor.

11. The network interface system of claim 10, wherein each of said programmably configurable protocol descriptions comprises a protocol control record and a plurality of field data records.

12. The network interface system of claim 11, wherein each said protocol control record defines an overall structure of a network protocol.

13. The network interface system of claim 12, wherein each protocol control record comprises a plurality of field sub-records, a plurality of statistics records, a plurality of lookup records, a plurality of expression records, a plurality of filter criteria records, and a plurality of value verification records.

14. A protocol analyzer comprising:
at least one network interface unit for communicating with a data communications network;
at least one memory coupled to said network interface unit, said memory being configured to store a plurality of network data files and a plurality of programmably configurable protocol descriptions, each programmably configurable protocol description comprising a protocol control record and a plurality of field subrecords, wherein said protocol control record defines an overall data structure of a selected data communication protocol;
a logic control module coupled to said at least one network interface unit and to said at least one memory, said logic control module having the capability to selectively retrieve one or more of said programmably configurable protocol descriptions from said memory and to execute one or more network analysis functions defined by said one or more retrieved protocol descriptions; and
at least one output device coupled to said logic control module for displaying a result of a network analysis function performed by said logic control module.

* * * * *